(12) United States Patent
Baggen

(10) Patent No.: US 10,166,734 B2
(45) Date of Patent: Jan. 1, 2019

(54) MOLD APPARATUS, MOLD SYSTEM, AND METHOD FOR MOLDING SOLE COMPONENT OF ARTICLE OF FOOTWEAR

(71) Applicant: NIKE, Inc., Beaverton, OR (US)

(72) Inventor: Jared S. Baggen, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 245 days.

(21) Appl. No.: 15/173,082

(22) Filed: Jun. 3, 2016

(65) Prior Publication Data

US 2016/0354987 A1    Dec. 8, 2016

Related U.S. Application Data

(60) Provisional application No. 62/170,799, filed on Jun. 4, 2015.

(51) Int. Cl.
*B29D 35/12* (2010.01)
*B29D 35/00* (2010.01)
*A43B 13/20* (2006.01)
*B29D 35/14* (2010.01)
*B29K 75/00* (2006.01)
(Continued)

(52) U.S. Cl.
CPC .......... *B29D 35/0018* (2013.01); *A43B 13/20* (2013.01); *B29D 35/0009* (2013.01); *B29D 35/0054* (2013.01); *B29D 35/122* (2013.01); *B29D 35/128* (2013.01); *B29D 35/142* (2013.01); *B29D 35/148* (2013.01);
(Continued)

(58) Field of Classification Search
CPC ........................ B29D 35/0018; B29D 35/0009
See application file for complete search history.

(56) References Cited

U.S. PATENT DOCUMENTS 2,429,286 A    10/1947   Young
2,525,609 A *  10/1950   Lewis ................ B29D 35/0027
                                                  425/119
(Continued)

FOREIGN PATENT DOCUMENTS

GB         266142 A    2/1927
GB         746396 A    3/1956
(Continued)

OTHER PUBLICATIONS

Sep. 16, 2016—(WO) ISR & WO—App. No. PCT/US2016/35821.
Dec. 14, 2017—(WO) IPRP—App. PCT/US2016/035821.

*Primary Examiner* — Jill L Heitbrink
(74) *Attorney, Agent, or Firm* — Banner & Witcoff, Ltd.

(57) ABSTRACT

A mold apparatus includes a first pivot arm having a first mold surface, a second pivot arm having a second mold surface opposing the first mold surface, and a driving cam member having a first driving cam surface configured to engage a first driven cam surface of the first arm to pivot the first arm in a first direction, and a second driving cam surface configured to engage a second driven cam surface of the second arm to pivot the second arm in a second direction opposite the first direction. The driving cam member moves between a first position, in which the first mold surface of the first arm and the second mold surface of the second arm form a continuous mold surface, and a second position, in which the first arm and the second arm are separated to enable removal of a molded element having an undercut mold surface contour.

20 Claims, 11 Drawing Sheets

(51) Int. Cl.
    *B29K 23/00*      (2006.01)
    *B29K 105/04*     (2006.01)
(52) U.S. Cl.
    CPC .... *B29K 2023/083* (2013.01); *B29K 2075/00* (2013.01); *B29K 2105/04* (2013.01)

(56)           References Cited

U.S. PATENT DOCUMENTS

| | | | |
|---|---|---|---|
| 3,403,423 | A | 10/1968 | McMorrow et al. |
| 3,865,529 | A | 2/1975 | Guzzo |
| 4,529,369 | A * | 7/1985 | Pita .................... B29D 35/0018 |
| | | | 264/244 |
| 5,281,127 | A | 1/1994 | Ramsey |
| 6,431,254 | B2 | 8/2002 | Dittrich |
| 6,454,554 | B1 | 9/2002 | Lopez et al. |
| 7,306,451 | B2 | 12/2007 | Kruger et al. |
| 7,585,453 | B2 | 9/2009 | Schwab et al. |
| 7,713,603 | B2 | 5/2010 | Farran et al. |
| 2009/0100705 | A1 | 4/2009 | Cook et al. |

FOREIGN PATENT DOCUMENTS

| | | | |
|---|---|---|---|
| GB | 838347 | * | 6/1960 |
| JP | 74045797 | B1 | 12/1974 |

\* cited by examiner

MOLD APPARATUS, MOLD SYSTEM, AND METHOD FOR MOLDING SOLE COMPONENT OF ARTICLE OF FOOTWEAR

CROSS REFERENCE TO RELATED APPLICATIONS

This application claims priority to Auger et al., U.S. Provisional Patent Application No. 62/170,799, filed on Jun. 4, 2015, the entire disclosure of which is incorporated herein by reference.

FIELD OF THE INVENTION

The present embodiments generally relate to mold apparatus, and more particularly relate to mold apparatus, a mold system, and a method for molding a molded component, such as a molded sole component of a sole structure for an article of footwear.

BACKGROUND

Articles of footwear typically include two elements, an upper and a sole structure. The upper may provide a covering for the foot that comfortably receives and securely positions the foot with respect to the sole structure. A sole structure may be secured to a lower portion of the upper and generally may be positioned between the foot and a ground surface or other surface. In addition to attenuating ground reaction forces (i.e., providing cushioning) during walking, running, and other ambulatory activities, a sole structure may facilitate control of foot motions (e.g., by resisting pronation), impart stability, facilitate control of twisting and/or bending motions, and provide traction, for example. Accordingly, a sole structure may cooperate with an upper to provide a comfortable structure that is suited for a wide variety of athletic or other activities.

A sole structure may include a sole component having an undercut structure or feature, e.g., at a peripheral side edge of a molded sole component. A sole component may be made by a molding process using a molding system with mold apparatus.

BRIEF DESCRIPTION OF THE DRAWINGS

The current embodiments may be better understood with reference to the following drawings and description. Elements, components, and features of the embodiments in the figures are not necessarily drawn to scale, emphasis instead being placed upon illustrating principles of the embodiments disclosed. In the figures, like reference numerals designate like or corresponding parts or features throughout the different views, with the initial digit(s) of each reference numeral indicating a figure in which the reference numeral first appears.

DETAILED DESCRIPTION OF EMBODIMENTS

Figure 1:
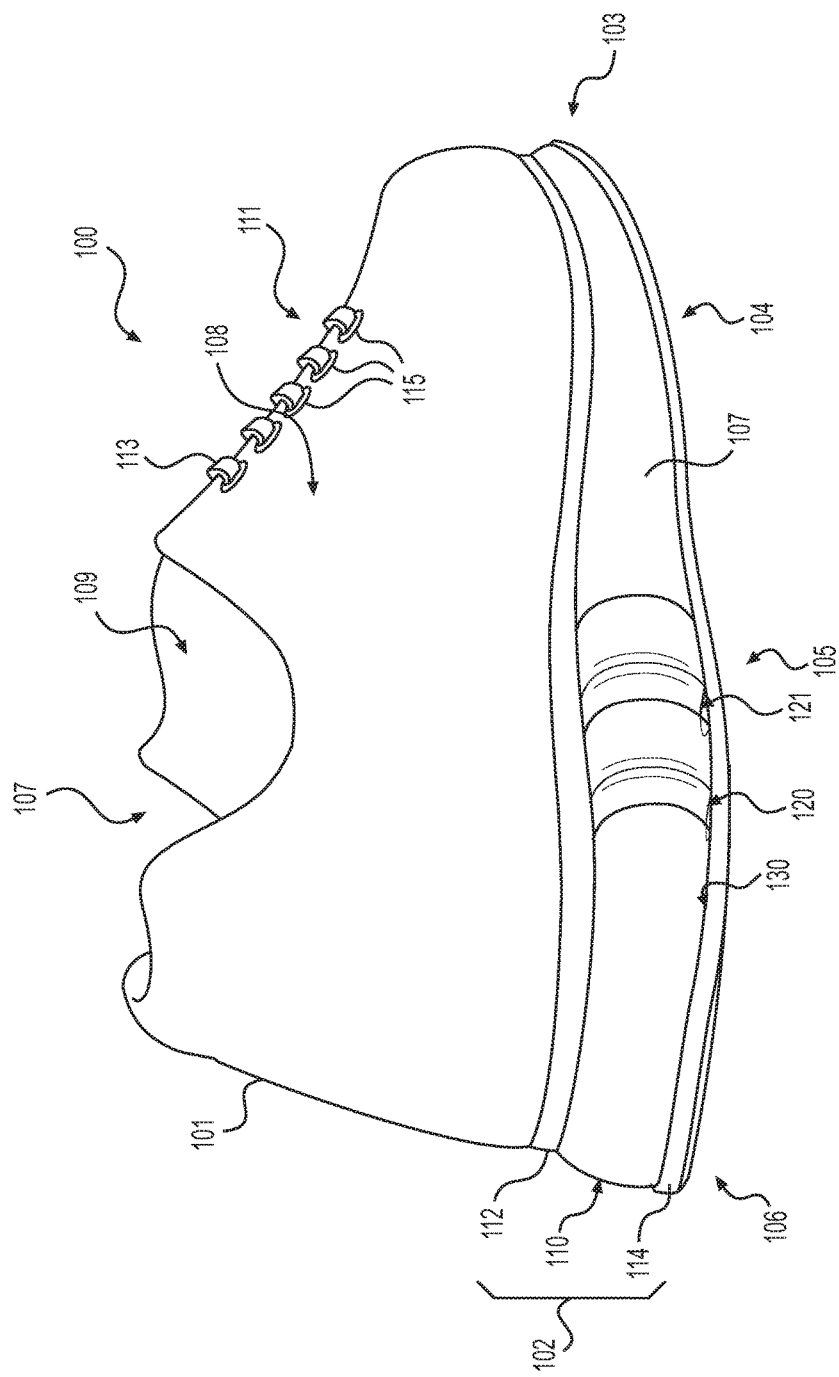
FIG. 1 is a schematic side perspective view of an embodiment of an article of footwear with a sole structure including a molded sole component.

Embodiments of mold systems in this description include mold apparatus suitable for molding a molded component having an undercut surface structure or feature. Mold apparatus of the present embodiments generally may include a first arm having a first mold surface, a second arm having a second mold surface opposing the first mold surface, and a driving cam member having a first driving cam surface configured to engage a first driven cam surface of the first arm to pivot the first arm in a first direction about a first pivot end of the first arm, and a second driving cam surface configured to engage a second driven cam surface of the second arm to pivot the second arm in a second direction about a pivot end of the second arm, the second direction being opposite the first direction. The driving cam member generally moves between a first position, in which a distal end of the first arm and a distal end of the second arm are located adjacent to one another and the first mold surface of the first arm and the second mold surface of the second arm form a continuous mold surface at the distal end of the first arm and the distal end of the second arm (closed state of the mold apparatus), and a second position, in which the distal end of the first arm and the distal end of the second arm are located remote from one another (separated), such that the first mold surface of the first arm and the second mold surface of the second arm do not form continuous mold surface at the distal end of the first arm and the distal end of the second arm (open state of the mold apparatus).

Mold apparatus of the present embodiments, including opposing first and second arms and a single cam driving member configuration, may enable a molding process using a low energy actuator to securely locate the first arm and second arm of the mold apparatus in the closed state for molding a molded component having an undercut molded surface feature, and to locate the first arm and the second arm of the mold apparatus in an open state (separated) for enabling unobstructed removal of a molded component having an undercut molded surface feature from the mold apparatus and mold system. It will be appreciated that, in some embodiments, mold apparatus of the present embodiments thus may provide a substantial improvement over mold systems in which an undercut mold structure of a molded component is formed using one or more moving mold element(s), where the moving mold element is located within a mold surface structure that forms the mold cavity and is configured to slide relative to the mold surface structure in a direction perpendicular or transverse to a pull or removal direction of the molded component from the mold cavity, thereby to free up the mold element that otherwise would remain trapped within the molded component.

In one aspect, the present embodiments relate to mold apparatus for a mold system for forming a molded component, where the molded component may have an undercut structure or feature, such as a molded sole component for an article of footwear. The mold apparatus may include a first arm configured to pivot about a pivot end of the first arm, in a first direction, the first arm including a first driven cam surface located at a distal end of the first arm and a first mold surface located between the pivot end and the distal end of the first arm, a second arm configured to pivot about a pivot end of the second arm in a second direction opposite the first direction, the second arm including a second driven cam surface located at a distal end of the second arm and a second mold surface located between the pivot end and the distal end of the second arm, the second mold surface of the second arm opposing the first mold surface of the first arm, and a driving cam member, the driving cam member including a first driving cam surface configured to engage the first driven cam surface of the first arm to pivot the first arm about the pivot end of the first arm in the first direction, and a second driving cam surface configured to engage the second driven cam surface of the second arm to pivot the second arm about the pivot end of the second arm in a second direction opposite the first direction, the driving cam member being configured to move between a first position and a second position. In the first position of the driving cam member, the first driving cam surface locates the first driven cam surface of the first arm at a first cam position of the first driving cam surface and the first driven cam surface, and the second driving cam surface locates the second driven cam surface of the second arm at a first cam position of the second driving cam surface and the second driven cam surface, such that the distal end of the first arm and the distal end of the second arm are located adjacent one another and the first mold surface of the first arm and the second mold surface of the second arm form a continuous mold surface at the distal end of the first arm and the distal end of the second arm. In the second position of the driving cam member, the first driving cam surface locates the first driven cam surface of the first arm at a second cam position of first driving cam surface and the first driven cam surface, and the second driving cam surface locates the second driven cam surface of the second arm at a second cam position of the second cam driving surface and the second driven cam surface, such that the distal end of the first arm and the distal end of the second arm are located remote from one another and the first mold surface of the first arm and the second mold surface of the second arm do not form a continuous mold surface at the distal end of the first arm and the distal end of the second arm.

In some embodiments, at least one of the first mold surface of the first arm and the second mold surface of the second arm may be configured to form a molded undercut structure or feature of a molded component. In some embodiments, a molded undercut feature may include a vertical undercut feature. In some embodiments, a molded undercut feature may include a horizontal undercut feature. In some embodiments, a horizontal undercut feature may be continuous from the first mold surface to the second mold surface of the mold apparatus.

In some embodiments, the driving cam member may include a first driving cam surface having an S-shaped configuration and a second driving cam surface having an S-shaped configuration, the S-shaped configuration of the second driving cam surface being a mirror image of the S-shaped configuration of the first driving cam surface. Alternatively, in some embodiments the first driven cam surface of the first arm may include an S-shaped configuration and the second driven cam surface of the second arm may include an S-shaped configuration, the S-shaped configuration of the second driven cam surface being a mirror image of the S-shaped configuration of the first driven cam surface. In some embodiments, a first position of the first S-shaped cam surface and/or a first position of the second S-shaped cam surface may be configured to maintain the first arm and the second arm of the mold apparatus in a closed state of the mold apparatus for a molding process. In some embodiments, the first position may form a detent structure configured to bias or otherwise maintain the mold apparatus in the closed configuration.

In another aspect, the present embodiments relate to a method for making a molded component. In some embodiments, the molded component may be a molded sole component. In some embodiments, the method may include processes for making a sole structure of an article of footwear having a molded sole component. In some embodiments, the method may include forming a molded sole component having a molded undercut structure or feature.

Each of the above aspects, embodiments, and features of a mold system, mold apparatus, and method for molding may improve at least one performance characteristic of a mold apparatus, mold system, method for molding, and a corresponding molded component, such as a molded sole component of a sole structure of an article of footwear. In particular, these aspects, embodiments, and features, alone and/or in combination, variously may efficiently provide desired undercut structure for a molded component, such as a molded sole component of a molded sole structure and article of footwear. Further, these aspects, embodiments, and features variously may be combined with one another and/or with other features to improve overall performance of a mold system, mold apparatus, method for molding, molded sole component, sole structure and article of footwear.

Other systems, methods, aspects, features, and advantages of embodiments will be, or will become, apparent to one of ordinary skill in the art upon examination of the figures and detailed description of embodiments. It is intended that all such additional systems, methods, aspects, features, and advantages be included within this description, be within the scope of the embodiments, and be protected by the following claims.

Molded Component Features

Figure 2:
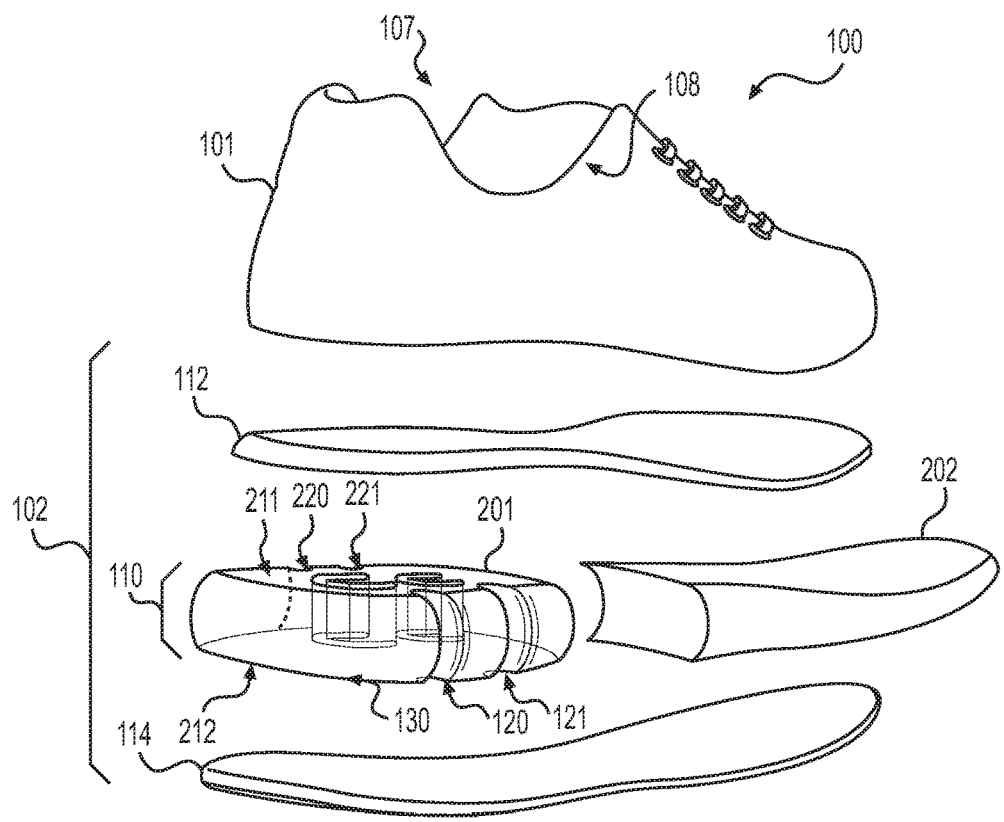
FIG. 2 is a schematic exploded side perspective view of an embodiment of the article of footwear and sole structure of FIG. 1.

An example of a molded component may be a molded sole component of a sole structure of an article of footwear. FIGS. 1 and 2 illustrate an embodiment of an article of footwear 100 generally including an upper 101 and a sole structure 102. FIG. 1 is a side perspective view of article of footwear 100. FIG. 2 is a schematic exploded view of article of footwear 100 of FIG. 1. As discussed below, in some embodiments sole structure 102 may include a molded sole component having an undercut molded surface feature.

The following discussion and accompanying figures disclose article of footwear 100 as having a general configuration suitable for walking or running. Concepts and features associated with article of footwear 100 also may be applied to a variety of athletic footwear types, including running shoes, baseball shoes, basketball shoes, cross-training shoes, cycling shoes, football shoes, golf shoes, and tennis shoes, for example. Concepts and features associated with article of footwear 100 also may be applied to footwear types that are generally considered to be non-athletic, including dress shoes, loafers, sandals, and work boots, for example. One skilled in the relevant art will appreciate that features and concepts of the disclosed embodiments may apply to a wide variety of footwear styles, in addition to the specific styles discussed in this detailed description of embodiments and depicted in the accompanying figures.

Embodiments of footwear generally may be described with reference to various regions or sides of article of footwear 100. As shown in FIG. 1, article of footwear 100 generally may have a toe region 103, a forefoot region 104, a midfoot region 105, and a heel region 106. Toe region 103 may form a portion of forefoot region 104. Article of footwear 100 generally may have a medial side 107 and a lateral side 108. It will be understood that references to toe region 103, forefoot region 104, midfoot region 105, heel region 106, medial side 107, and lateral side 108 are only intended for purposes of description and are not intended to demarcate precise portions or regions of sole structure 102. It will be appreciated that toe region 103, forefoot region 104, midfoot region 105, heel region 106, medial side 107, and lateral side 108 also may be used to describe a component of article of footwear 100.

For consistency and convenience, directional adjectives are employed throughout this detailed description corresponding to the illustrated embodiments. Generally, as used herein directional adjectives have their usual meaning. The term "longitudinal" as used throughout this detailed description and in the claims refers to a direction extending a length of a component, such as a sole structure or a mold system structure. In some cases, a longitudinal direction may extend from a forefoot portion to a heel portion of the component. The term "lateral" as used throughout this detailed description and in the claims refers to a direction extending a width of a component. In some cases, a lateral direction may extend between a medial side and a lateral side of the component, or along the width of the component. The terms longitudinal and lateral can be used with any component of an article of footwear, including a sole structure as well as individual components of the sole structure, or with any component of a mold system. The term "vertical" as used throughout this detailed description and in the claims may refer to a direction generally perpendicular to a horizontal ground surface in a state where sole structure 102 of article of footwear 100 is disposed flat on the horizontal ground surface. The terms "front", "rear", "proximal", and "distal" may refer to relative directions of an article of footwear, mold apparatus, mold system, or a component of an article of footwear, mold apparatus, or mold system. Those skilled in the art will appreciate the meaning of these terms based on the context in which the term is used in this detailed description of embodiments and in the claims.

Referring again to FIGS. 1 and 2, the following discussion and accompanying figures describe article of footwear 100 as generally having an upper 101 and a sole structure 102. Upper 101 and sole structure 102 each variously may include one or more elements or components. Those skilled in the art will appreciate various combinations of configurations and constructions of upper 101 and sole structure 102 in view of this detailed description of embodiments.

Upper 101 may vary in different embodiments. Upper 101 generally may have any known or later developed configuration. As shown in FIG. 1, upper 101 may be depicted as having a configuration incorporating a plurality of material elements (e.g., knit, woven, or other textiles, foam, leather, synthetic leather, and other materials) that are stitched or adhesively bonded together to form an interior void for securely and comfortably receiving a foot. The material elements may be selected and located with respect to upper 101 in order to selectively impart properties of durability, air-permeability, wear-resistance, flexibility, and comfort, for example. In some embodiments, an ankle opening 109 may be provided in heel region 106 to provide access to the interior void. In some embodiments, upper 101 may include a fastening or closing system 111 that may be utilized to modify the dimensions of the interior void, thereby securing the foot within the interior void and facilitating entry and removal of the foot from the interior void. For example, in some embodiments fastening or closing system 111 may be a lacing system that includes lacing 113 that may be laced through apertures 115 in upper 101. In some embodiments, a tongue portion (not shown) of upper 101 may extend between the interior void and lacing 113. Because various aspects of the present disclosure primarily relate a component of sole structure 102, and a mold system for making such a component of sole structure 102, it will be appreciated that upper 101 may exhibit the general configuration discussed above or the general configuration of practically any other known or later developed upper suitable for a desired application. Accordingly, the overall structure and configuration of upper 101 may vary significantly in different embodiments.

Sole structure 102 generally may be disposed below upper 101 and configured to engage a ground surface during active use of article of footwear 100. In this manner, sole structure 102 may operate to attenuate impact and other ground reaction forces and absorb energy, e.g., as sole structure 102 engages a ground surface.

Sole structure 102 may be associated with upper 101 in different ways in different embodiments. As shown in FIG. 1, in some embodiments sole structure 102 may be secured to a lower surface of upper 101, such as by stitching, adhesive bonding, or thermal bonding. Those skilled in the art will appreciate various ways of associating sole structure 102 with upper 101 based on this detailed description of embodiments.

A configuration and construction of sole structure 102 may vary in different embodiments. Sole structure 102 variously may include one or more components in different embodiments. For example, as shown in FIGS. 1 and 2, in some embodiments sole structure 102 may include a first sole component 110, a second sole component 112, and a third sole component 114. In some embodiments, second sole component 112 may be an outer sole component. In some embodiments, third sole component 114 may be a midsole component. In some embodiments, first sole component 110, second sole component 112, and third sole component 114 may be layers of a multi-layer sole structure. For example, in some embodiments sole structure 102 generally may be a multi-layer structure including first sole component 110 disposed between second sole component 112 and third sole component 114. In some embodiments, second sole component 112 and/or third sole component 114 may be optional. In some embodiments, a sole component may include plural components or elements. For example, as shown in FIG. 2, in some embodiments first sole component 110 may include a molded sole component 201 located in heel region 106, and another sole component 202 located in forefoot region 104. In some embodiments, sole structure 102 may include additional elements or components. For example, in some embodiments article of footwear 100 may include an inner sole component or element (not shown) disposed within upper 101 adjacent a foot disposed in article of footwear 100. In some embodiments, each of a plurality of sole components may be separately formed, e.g., by separate molding processes or other manufacturing processes, and then associated with one another by various means, such as stitching, adhesive bonding, or other attaching means to form an assembled sole structure. Those skilled in the art will appreciate alternative sole structures and components suitable for a particular application based on this detailed description of embodiments.

A configuration of a peripheral edge portion of sole structure 102 may vary in different embodiments. For example, in some embodiments one or more portion, element, or component of sole structure 102 may be exposed around a peripheral edge of sole structure 102, e.g., at medial side 107 or at lateral side 108. In some embodiments, a portion, element, or component of sole structure 102 may have an undercut feature, e.g., located on a peripheral edge of a sole component at medial side 107 or lateral side 108. An undercut feature of a sole component may be localized, e.g., located in only one region of sole structure 102, or may be regional, e.g., generally extending through one or more regions of sole structure 102. For example, as shown in FIGS. 1 and 2, in some embodiments first sole component 110 may include at least one vertically oriented undercut feature, such as vertical recess 120 and vertical recess 121 located on lateral side 108 in heel region 106 (see FIG. 1), and vertical recess 220 and vertical recess 221 located on medial side 107 (see FIG. 2). On the other hand, in some embodiments first sole component 110 may include a laterally or horizontally oriented undercut feature, such as lower edge undercut portion 130 that may extend continuously along medial side 107 around heel region 103 and along lateral side 108 of first sole component 110 between first sole component 110 and third sole component 114. Those skilled in the art will appreciate various peripheral edge configurations and constructions of sole structure 102 including undercut features based on this detailed description of embodiments.

A configuration and construction of each sole component may vary in different embodiments. For example, as shown in FIGS. 1 and 2, each of first sole component 110 (including molded sole component 201 and sole component 202), second sole component 112, and third sole component 114 may have a generally planar configuration, and may be stacked to form a multi-layered sole structure 102.

Figure 3:
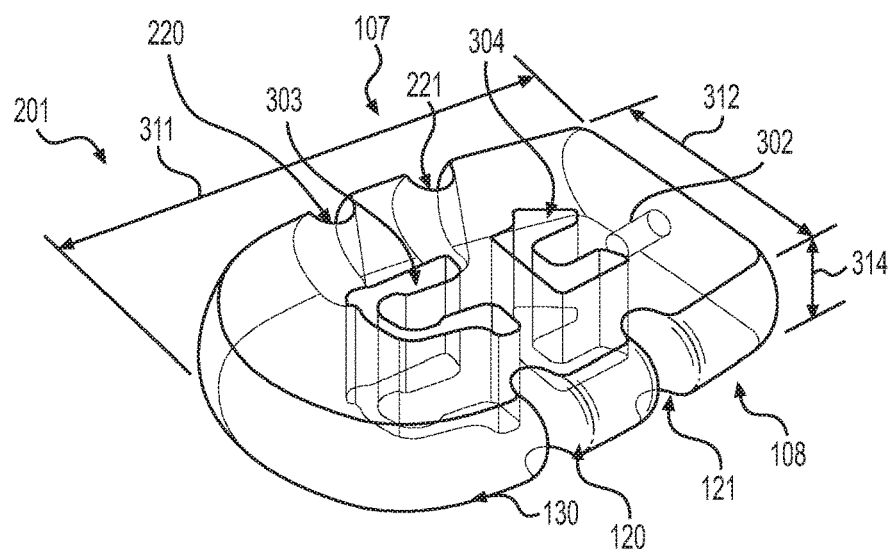
FIG. 3 is a schematic side perspective of a molded sole component of the sole structure of FIG. 2.

A configuration of molded sole component 201 may vary in different embodiments. As shown in FIGS. 1 and 2, in some embodiments molded sole component 201 may be generally planar. FIG. 3 is a schematic side perspective view of an embodiment of a molded sole component 201 suitable for use in heel region 106 of sole structure 102. As shown in FIG. 3, in some embodiments molded sole component 201 may be a fluid-filled chamber or support element. On the other hand, in some embodiments molded sole component 201 may have a substantially solid configuration. In some embodiments, an upper surface 211 and a lower surface 212 of molded sole component 201 each may have a generally flat, horizontal configuration. As shown in FIG. 3, in some embodiments molded sole component 201 may have one or more molded surface features, including one or more hidden molded surface features shown in dashed lines. For example, as shown in FIG. 3, in some embodiments molded sole component 201 may include various undercut features around its peripheral edge, such as vertical recess 120, vertical recess 121, vertical recess 220, vertical recess 221, and continuous lateral or horizontal undercut feature 130. In some embodiments, e.g., in a fluid-filled chamber or support element embodiment, molded component 201 may include a fluid fill tube 302. In some embodiments, molded component 201 may include at least one molded structure or feature on upper surface 211 and/or at least one molded structure or feature on lower surface 212, e.g., that forms an indentation or void, such as vertical channel 303 and vertical channel 304. Those skilled in the art will appreciate alternative and additional molded structures and features suitable for a desired molded sole component 201.

A construction of molded sole component 201 may vary in different embodiments. On the one hand, because sole structure 102 may operate to attenuate impact and other ground reaction forces and absorb energy, e.g., as sole structure 102 engages a ground surface during active use, in some embodiments molded sole component 201 may be a hollow chamber or support element made by any manufacturing method suitable for conforming one or more sheets of a mold material within a mold cavity of a mold system, e.g., using a thermoforming mold process (see, e.g., U.S. Patent Application Publication No. 2009/0100705 published Apr. 23, 2009, to Christopher S. Cook, et al., and entitled Article of Footwear With A Sole Structure Having Fluid Filled Support Elements, incorporated herein by reference in its entirety. In such case, a sheet of mold material may be formed of a plastic material, such as a polymer material. Alternatively, in some embodiments molded sole component 201 may be made of a foam material having an open or closed cell foam material construction, e.g., a polymer foam material, such as polyurethane or ethylvinylacetate. In such case, in some embodiments molded sole component 201 may be made by any manufacturing method suitable for making a foam material component. For example, in some embodiments first sole component 201 may be made by injection molding a polymer foam material. On the other hand, because sole structure 102 may operate to engage a ground surface and impart traction to article of footwear 100, in some embodiments (e.g., in embodiments were optional second sole component 112 is not present in sole structure 102) molded sole component 201 may be made of a durable, wear-resistant material. For example, in some embodiments molded sole component 201 may be made of a rubber material. In such case, molded sole component 201 may be made by any manufacturing method suitable for making a molded rubber material component. For example, in some embodiments molded sole component 201 may be made by hot press molding a rubber material. Those skilled in the art will appreciate alternative and additional materials and methods of making a molded sole component 201 suitable for a desired application based on this detailed description of embodiments.

Dimensional features of a molded component may vary in different embodiments. For example, dimensional features of a molded sole component 201, including at least a length 311 measured in a longitudinal direction of molded sole component 201, a width 312 measured in a lateral direction of molded sole component 201, and a height 314 measured in a vertical direction of molded sole component 201, may vary depending on a number of factors including, but not limited to, respective materials of first sole component 110

(including molded sole component 201 and sole component 202), second sole component 112, and third sole component 114, and respective configurations of first sole component 110 (including molded sole component 201 and sole component 202), second sole component 112, and third sole component 114. Those skilled in the art will be able to select dimensional features of molded sole structure 102 in view of this detailed description of embodiments.

Mold System and Mold Apparatus Features

A mold system suitable for forming a molded component having an undercut feature may vary in different embodiments. Embodiments of mold systems described below may be described with respect to thermoforming molding processes for forming a hollow fluid-filled chamber or support element. It will be appreciated, however, that embodiments of mold systems and mold apparatus described below may be used in other molding processes. Those skilled in the art will appreciate alternative mold systems, mold apparatus, and molding processes in light of the present description.

Figure 4:
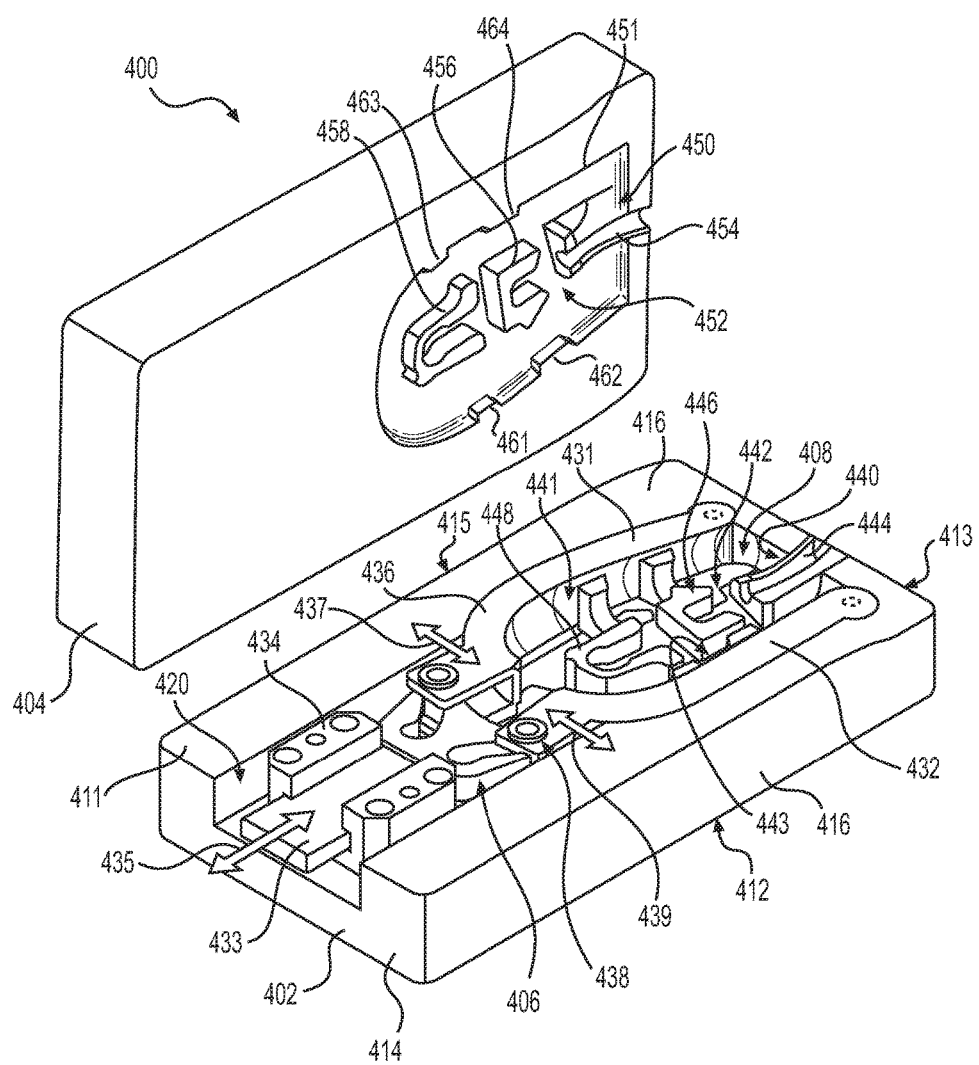
FIG. 4 is a schematic side perspective view of an embodiment of a mold system with mold apparatus for molding a molded component of FIG. 3.

FIG. 4 schematically illustrates a mold system 400 including mold apparatus suitable for molding a molded component having an undercut feature. In some embodiments, a molded component formed in mold system 400 may be a molded sole component for a sole structure of an article of footwear, such as sole component 201 of sole structure 102 of article of footwear 100 shown in FIGS. 1 to 3.

A configuration of mold system 400 may vary in different embodiments. As shown in FIG. 4, in some embodiments mold system 400 generally may include a lower mold body 402, an upper mold body 404, and mold apparatus 406 associated with lower mold body 402 and disposed between upper mold body 402 and upper mold body 404. In some embodiments lower mold body 402, upper mold body 404, and mold apparatus 406 may cooperate to form a mold cavity 408, e.g., suitable for forming a molded component. In some embodiments, mold cavity 408 may be configured for forming a molded component having a molded undercut surface or feature.

Figure 9:
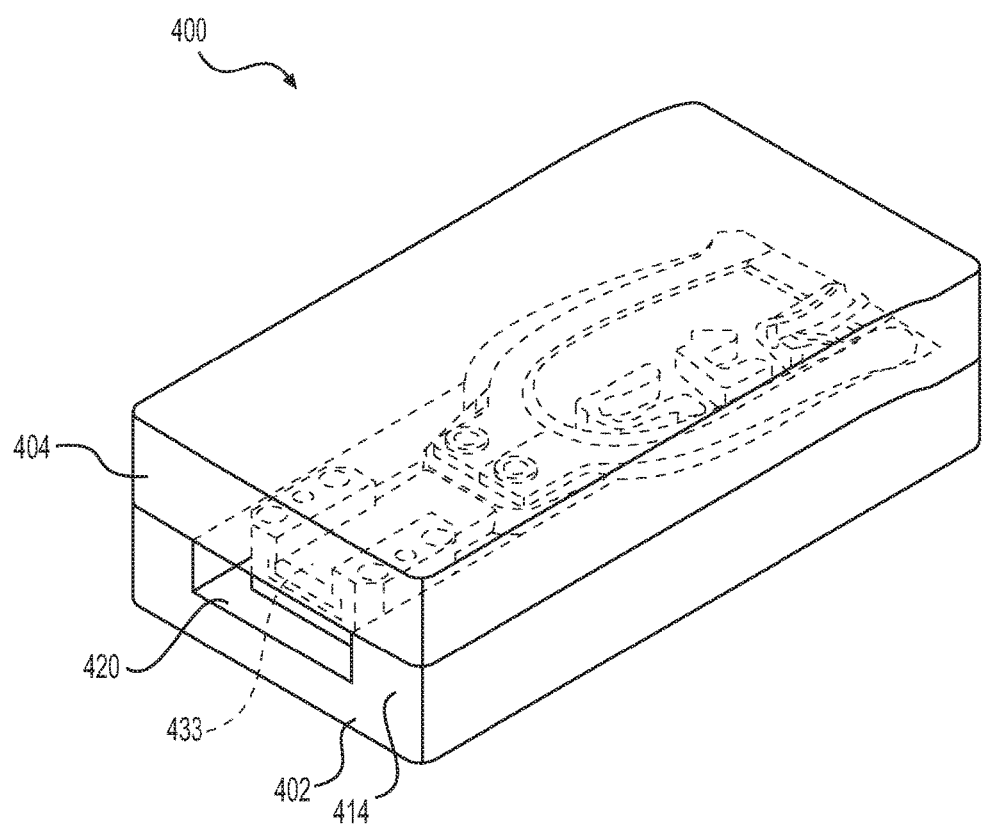
FIG. 9 is a schematic side perspective view of the mold system of FIG. 8 configured in a closed state, schematically illustrating an embodiment of a process for molding a molded component of FIG. 3.

A configuration of lower mold body 402 may vary in different embodiments. As shown in FIG. 4, in some embodiments lower mold body 402 generally may have a rectangular block configuration including an upper surface 411, a lower surface 412 located opposite upper surface 411, a first (top) end 413, a second (bottom) end 414 located opposite top end 413, a first side 415, and a second side 416 located opposite first side 415. As shown in FIG. 4, in some embodiments lower mold body 402 may include a recess 420 formed in upper surface 411. As shown in FIG. 4, in an open state of mold system 400, recess 420 may be open or exposed to the external environment at upper surface 411. As shown in FIG. 4, in the open state of mold system 400, in some embodiments recess 420 also may be open or exposed to the external environment at bottom end 414. It will be appreciated that, with this configuration of lower mold body 402 and mold apparatus 406, mold apparatus 406 may be accessed from upper surface 411 in an open state of mold apparatus 400, and at least some components of mold apparatus 406 may be accessed from bottom end 414 of mold system 400 in a closed state of mold system 400 (see, e.g., FIG. 9).

A configuration of mold apparatus 406 in mold system 400 may vary in different embodiments. As shown in FIG. 4, in some embodiments mold apparatus 406 generally may have a clam shell configuration. As shown in FIG. 4, mold apparatus 406 generally may include a first arm 431, a second arm 432 located opposite first arm 431, and a driving cam member 433. As shown in FIG. 4, in some embodiments first arm 431 generally may be located in recess 420 adjacent top end 413 and first side 415, second arm 432 generally may be located in recess 420 adjacent top end 413 and second side 416, opposing first arm 431 in a horizontal plane, and driving cam member 433 generally may be located in recess 420 adjacent bottom end 414. As shown in FIG. 4, in some embodiments mold apparatus 406 may include a guide member 434 configured for supporting driving cam member 433 to slide in a direction of arrow 435, toward and away from first arm 431 and second arm 432. As shown in FIG. 4, in some embodiments guide member 434 may support driving cam member 433 in a generally horizontal plane. As discussed further below, driving cam member 433 of mold apparatus 406 generally may include cam structure for driving corresponding cam structure of first arm 431 to pivot a distal end 436 of pivot first arm 431 in a direction of arrow 437, and for driving corresponding cam structure of second arm 432 to pivot a distal end 438 of second arm 432 in a direction of arrow 439. It also will be appreciated that, in this configuration of mold apparatus 406, driving cam member 433 may be accessed and operated through recess 420 at bottom end 414 in a closed state of mold system 400 (see, e.g., FIG. 9).

A configuration of recess 420 of lower mold body 402 may vary in different embodiments. Generally, a configuration of recess 420 may be selected to receive mold apparatus 406, and to form a lower portion of mold cavity 408. As shown in FIG. 4, in some embodiments recess 420 may be configured to receive first arm 431, second arm 432, and driving cam member 433 arranged in an open state of mold apparatus 406, in which distal end 436 of first arm 431 and distal end 438 of second arm 432 are located remote from one another (separated). As shown in FIG. 4, a configuration of recess 420 also may be selected to form various mold surfaces that cooperate with mold surfaces of first arm 431 and second arm 432 in a closed state of mold apparatus 406 to form a desired configuration of mold cavity 408 corresponding to a desired molded component. For example, as shown in FIG. 4, in some embodiments recess 420 may be at least substantially closed at top end 413 to form desired mold surfaces of mold cavity 408 corresponding to features of a side edge of a desired molded component. Similarly, as shown in FIG. 4, in some embodiments recess 420 may form mold surfaces of mold cavity recess 408 corresponding to features of a lower surface of a desired molded component. Recess 420 of lower mold body 402 also may be configured to cooperate with a configuration of upper mold body 404, which may be configured to form mold surfaces of mold cavity 408, e.g., to form an upper surface of a molded component.

A configuration of upper mold body 404 may vary in different embodiments. Upper mold body 404 generally may have any configuration that cooperates with lower mold body 402 and mold apparatus 406 to form mold cavity 408. For example, as shown in FIG. 4, in some embodiments upper mold body 404 generally may have a rectangular block configuration that corresponds to a rectangular block configuration of lower mold body 402, and may include mold surfaces configured to form a corresponding upper surface of a molded component.

A mold surface configuration of upper mold body 404 may vary in different embodiments. In some embodiments, upper mold body 404 may have a mold surface 450 formed in a central region of upper mold body 404. As shown in FIG. 4, in some embodiments mold surface 450 generally may be located and configured to cooperate with lower mold body 402 and mold apparatus 406 to form mold cavity 408 adjacent top end 413 of lower mold body 402 in a closed state of mold system 400. As shown in FIG. 4, in some embodiments mold surface 450 may include a peripheral edge portion 451 that defines at least a portion of an upper peripheral edge of a corresponding molded component.

A configuration of mold cavity 408 may vary in different embodiments. Generally, mold cavity 408 may include mold surfaces of lower mold body 402, upper mold body 404, first arm 431, and second arm 432. For example, as shown in FIG. 4, in some embodiments mold cavity 408 generally may include top end mold surface 440 and lower mold surface 442 of lower mold body 402, peripheral edge portion 451 and upper mold surface 452 of upper mold surface 450 of upper mold body 404, a first mold surface 441 of first arm 431, and a second mold surface 443 of second arm 432.

Mold cavity 408 may include additional mold surface features in different embodiments. In some embodiments, e.g., where a molded component is a fluid-filled chamber or support element, mold cavity 408 may include mold surface structure for molding a conduit or feed tube configured for injecting fluid into the fluid-filled chamber. For example, as shown in FIG. 4, in some embodiments mold cavity 408 may include a lower tube mold surface 444 formed at top end 413 of lower mold body 402, and a corresponding upper tube mold surface 454 formed in upper mold surface 450 of upper mold body 404. It will be appreciated that lower tube mold surface 444 and upper tube mold surface 454 may be configured to oppose one another in a closed state of mold system 400 to form a molded component having a conduit or tube configured for injecting fluid into the fluid-filled chamber, e.g., during or after a molding process. In some embodiments, mold cavity 408 may include mold surface features configured for molding other internal or external elements or features of a molded component. For example, as shown in FIG. 4, in some embodiments mold cavity 408 may include at least one lower chamber mold surface feature located on lower mold surface 442 of lower mold body 402 and/or at least one upper chamber mold surface feature located on upper mold surface 452 of upper mold body 404. As shown in FIG. 4, in some embodiments mold cavity 408 may include a first lower chamber mold surface feature 446 and a second lower chamber mold surface feature 448 located on lower mold surface 442, and a first upper chamber mold surface feature 456 and a second upper mold surface feature 458 located on upper mold surface 452. As shown in FIG. 4, in some embodiments lower chamber mold surface feature 446 and upper chamber mold surface feature 456 may form opposing molded surface contours on the lower surface and upper surface of a molded component. In some embodiments, lower chamber mold surface feature 446 and upper chamber mold surface feature 456 may be configured to oppose one another and engage one another in a closed state of mold system 400. In this configuration, lower chamber mold surface feature 446 and upper chamber mold surface feature 456 may be configured to form a molded component having opposing recessed portions in a vertical direction. Alternatively, in some embodiments lower chamber mold surface feature 446 and upper mold surface feature 456 may be configured to form a void that extends vertically from a lower surface of the molded component to an upper surface of the molded component (i.e., a void that is exposed at the lower surface and the upper surface of the molded component). Those skilled in the art will appreciate alternative mold surface features of mold cavity 408 suitable for forming a molded component having desired surface features or configurations.

In some embodiments, upper mold surface 450 may include at least one mold surface feature that cooperates with mold surface 441 of first arm 431 and/or with mold surface 443 of second arm 432. For example, as shown in FIG. 4, in some embodiments upper mold surface 450 may include a first vertical recess mold surface feature 461 and a second vertical recess mold surface feature 462 configured to cooperate with first mold surface 441 of first arm 431, and a third vertical recess mold surface feature 463 and a fourth vertical recess mold surface feature 464 configured to cooperate with second mold surface 443 of second arm 432. It will be appreciated that, in some embodiments, such mold surface features may be configured to form respective continuous surface features of a corresponding molded component, e.g., at a peripheral edge of the molded component.

Dimensional features of mold cavity 408 (i.e., dimensional features of lower mold body 402 and upper mold body 404) may be selected to correspond to dimensional features of a desired molded component. Those skilled in the art will appreciate alternative mold surface features and dimensional features of mold cavity 408 suitable for molding a desired molded component.

Figure 5:
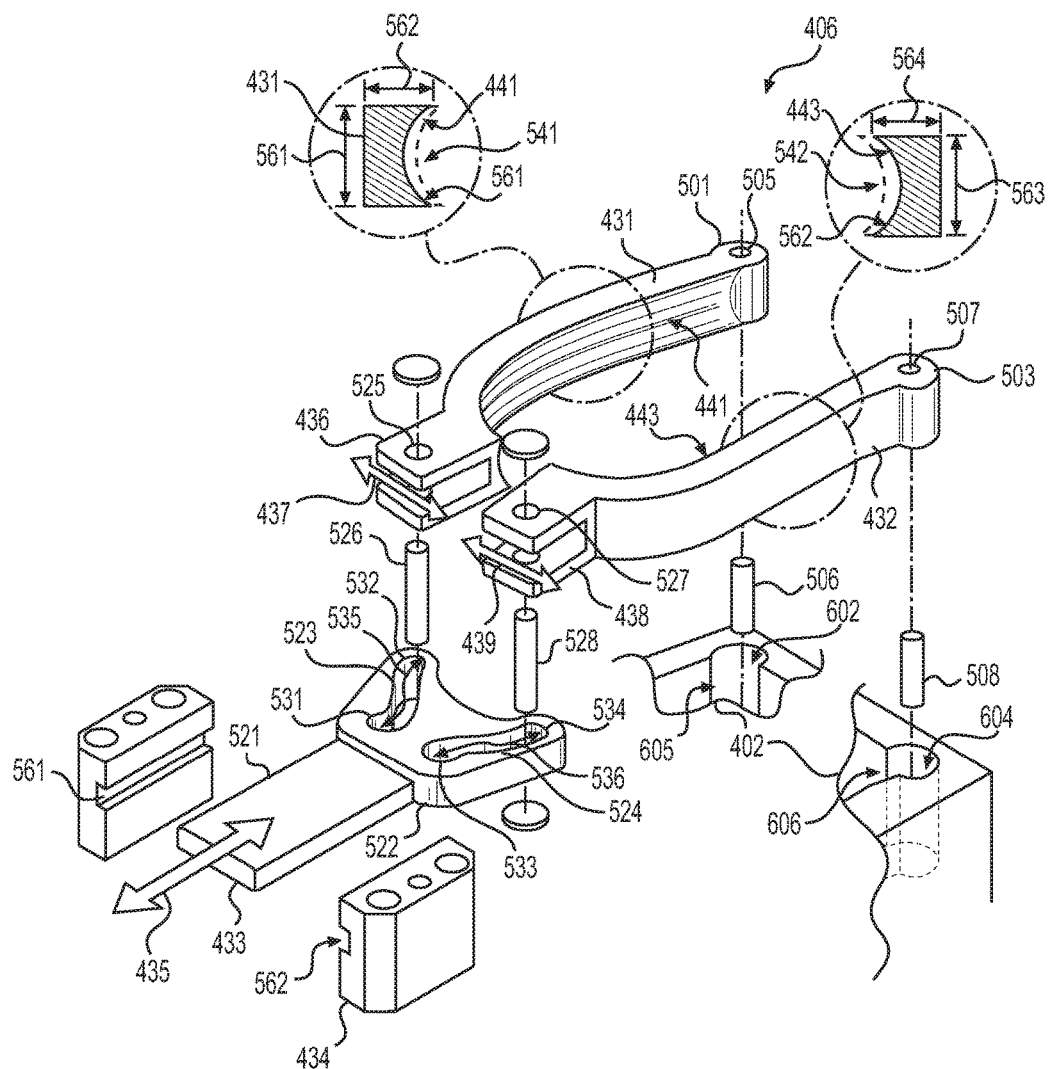
FIG. 5 is a schematic exploded side perspective view of an embodiment of mold apparatus of FIG. 4.
Figure 6:
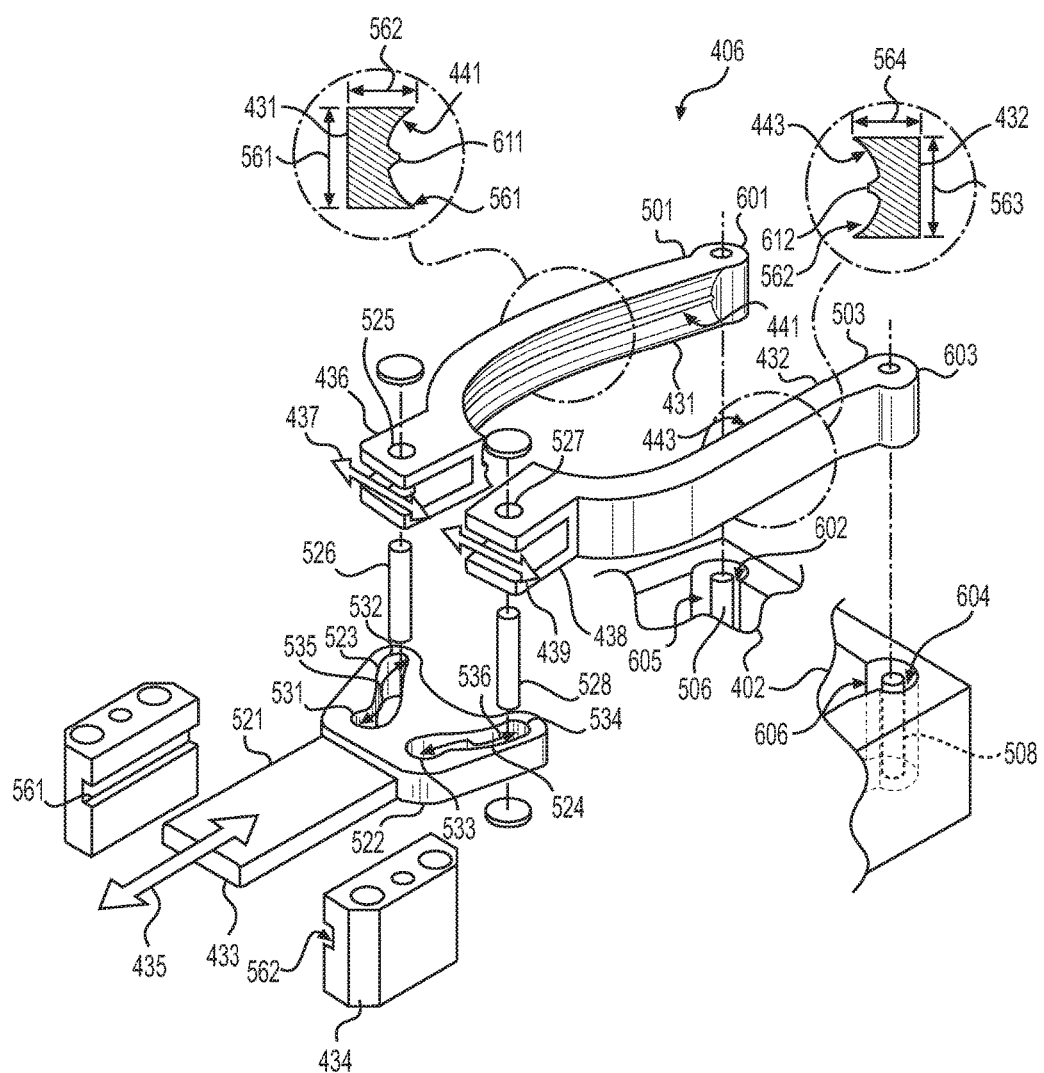
FIG. 6 is a schematic exploded side perspective view of another embodiment of mold apparatus of FIG. 4.

A configuration of mold apparatus 406 may vary in different embodiments. FIGS. 5 and 6 are schematic exploded side perspective views of various embodiments of mold apparatus 406 shown in FIG. 4. As shown in FIGS. 5 and 6, in some embodiments mold apparatus 406 generally may include a first arm 431, a second arm 432, and a driving cam member 433. As shown in FIGS. 5 and 6, in some embodiments mold apparatus 406 may include a guide member 434 configured for supporting driving cam member 433 to slide in a direction of arrow 435. As shown in FIGS. 5 and 6, in some embodiments first arm 431 generally may have a pivot end 501 and first mold surface 441 may be located between pivot end 501 and distal end 436 of first arm 431. Similarly, as shown in FIGS. 5 and 6, in some embodiments second arm 432 may have a pivot end 503 and second mold surface 443 may be located between pivot end 503 and distal end 438 of second arm 432.

A configuration of pivot structure for first arm 431 and second arm 432 may vary in different embodiments. As shown in FIG. 5, in some embodiments pivot end 501 of first arm 431 may include a hole 505 having a generally cylindrical shape oriented in a vertical direction and configured for receiving a pin 506 located on lower mold body 402, and pivot end 503 of second arm 432 may include a hole 507 having a generally cylindrical shape oriented in a vertical direction and configured for receiving a pin 508 located on lower mold body 402. With this configuration, it will be appreciated that first arm 431 may pivot about pin 506 at pivot end 501 of first arm 431, in a direction of arrow 437, and second arm 432 may pivot about pin 508 at pivot end 503 of second arm 432, in a direction of arrow 439. It also will be appreciated that, in this manner, each of first arm 431 and second arm 432 may be pivoted in a direction toward or away from the other one of first arm 431 and second arm 432, e.g., in opposing directions and in opposing manner.

A configuration of cam structure for driving first arm 431 and second arm 432 to pivot about pivot end 501 and pivot end 503, respectively, may vary in different embodiments. As shown in FIG. 5, in some embodiments driving cam member 433 may include a slide portion 521 and a cam portion 522. As shown in FIG. 5, in some embodiments cam portion 522 may extend from slide portion 521 in a direction of first arm 431 and second arm 432. As shown in FIG. 5, in some embodiments cam portion 522 may include a first cam surface 523 and a second cam surface 524. As shown in FIG. 5, in some embodiments first cam surface 523 may be formed by a recess or hole having a generally S-shaped configuration. Similarly, as shown in FIG. 5, in some embodiments second cam surface 524 may be formed by a recess or hole having a generally S-shaped configuration. As shown in FIG. 5, in some embodiments first cam surface 523 and second cam surface 524 may have a mirror image configuration, so that the S-shaped recess or hole of first cam surface 523 and the S-shaped recess or hole of second cam surface 524 converge in a direction away from first arm 431 and second arm 432 and diverge in a direction toward first arm 431 and second arm 432. As shown in FIG. 5, in some embodiments first arm 431 may include a recess or hole 525 located at distal end 436 of first arm 431 and configured for receiving a first cam pin 525, and second arm 432 may include a recess or hole 527 located at distal end 438 of second arm 432 and configured for receiving a second cam pin 528.

Operation of cam structure for driving first arm 431 and second arm 432 to pivot about pivot end 501 and pivot end 503, respectively, may vary in different embodiments. In some embodiments, driving cam member 433 may be configured to slide in a direction of arrow 435, e.g., along opposing guide channel 561 and guide channel 562 of support member 434, which may be supported within recess 420 of lower mold body 402. It will be appreciated that, as shown by arrow 535 in FIG. 5, in some embodiments first cam pin 526 may be located opposing first cam surface 523, so that first cam pin 526 may follow first cam surface 523 between a first cam position 531 located at or near one end of the S-shaped recess or hole of first cam surface 523 and a second cam position 532 located at or near the other end of the S-shaped recess or hole of first cam surface 523 as driving cam member 433 is moved in a direction of arrow 435. Similarly, it will be appreciated that, as shown by arrow 536 in FIG. 5, in some embodiments second cam pin 528 may be located opposing second cam surface 524, so that second cam pin 528 may follow second cam surface 524 between a first cam position 533 located at or near one end of the S-shaped recess or hole of second cam surface 524 and a second cam position 534 located at the other end of the S-shaped recess or hole of second cam surface 524 as driving cam member 433 is moved in a direction of arrow 435. It will be appreciated that, with this cam configuration, movement of driving cam member 433 in a direction of arrow 435 away from first arm 431 and second arm 432, may cause first cam pin 526 to follow first cam surface 523 to second cam position 532 and distal end 436 of first arm 431 may pivot about pivot end 501 in a direction of arrow 437 away from distal end 438 of second arm 432. Similarly, it will be appreciated that, with this cam configuration, movement of driving cam member 433 in the direction of arrow 435 away from first arm 431 and second arm 432 may cause second cam pin 528 to follow second cam surface 524 to second cam position 534 and distal end 438 of second arm 432 may pivot about pivot end 503 in a direction of arrow 439 away from distal end 436 of first arm 431. Conversely, it will be appreciated that, with this cam configuration, movement of driving cam member 433 in a direction of arrow 435 toward first arm 431 and second arm 432 may cause first cam pin 526 to follow first cam surface 523 to first cam position 531 and distal end 436 of first arm 431 may pivot about pivot end 501 in a direction of arrow 437 toward distal end 438 of second arm 432. Similarly, it will be appreciated that, with this cam configuration, movement of driving cam member 433 in a direction of arrow 435 toward first arm 431 and second arm 432 may cause second cam pin 528 to follow second cam surface 524 to first cam position 533 and distal end 438 of second arm 432 may pivot about pivot end 503 in a direction of arrow 439 toward distal end 436 of first arm 431. It further will be appreciated that, in this manner, first arm 431 and second arm 432 simultaneously may be pivoted between a first state (e.g., a closed state of mold apparatus 406) and a second state (e.g., an open state of mold apparatus 406).

An orientation of first cam surface 523 and second cam surface 524 may vary in different embodiments. In some embodiments, first cam surface 523 and second cam surface 524 may have an orientation that enables efficient operation of mold apparatus 406 for a molding process. For example, as shown in FIG. 5, in some embodiments first cam surface 523 and second cam surface 524 may be oriented so that, at first cam position 531 of first cam surface 523 and at first cam position 533 of second cam surface 524, first cam surface 523 and second cam surface 524 have a generally straight, parallel configuration that extends along a direction of arrow 435. It will be appreciated that, with this straight, parallel configuration, an expansion pressure force generated in a molding process that tends to pivot first arm 431 and second arm 432 away from one another (i.e., tends to separate distal end 436 of first arm 431 from distal end 438 of second arm 432) effectively will be applied by the cam structure in a direction of arrow 437 and arrow 439, respectively. That is, such an expansion pressure force generated in a molding process may cause first cam pin 526 to exert a force in a direction substantially perpendicular to first cam surface 523 at first cam position 531. Similarly, such an expansion pressure force generated in a molding process may cause second cam pin 528 to exert a force in a direction substantially perpendicular to second cam surface 524 at first cam position 533. In this manner, this configuration and orientation of first cam surface 523 and second cam surface 524 may provide an effective detent or locking mechanism for the cam structure of mold apparatus 406. That is, it will be appreciated that such configuration and orientation of first cam surface 523 and second cam surface 524 may operate such that mold apparatus 406 may be maintained in a closed state in a molding process using an actuator having a low energy characteristic regardless of an amount of expansion pressure force generated in a molding process. Accordingly, mold apparatus 406 may be operated using an actuator having a small energy characteristic that is sufficient only to move driving cam member 433 between a first (closed) state and a second (open) state of mold apparatus 406, e.g., before and after a molding process that generates an expansion pressure force in mold system 400.

Mold surface contours of first arm 431 and second arm 432 may vary in different embodiments. As shown in FIG. 5, in some embodiments first mold surface 441 of first arm 431 and second mold surface 443 of second arm 432 may be configured to form a corresponding first peripheral edge and second peripheral edge of a molded component, e.g., corresponding to a first peripheral edge located on medial side 107 of molded sole component 201 and a second peripheral edge located on medial side 108 of molded sole component 201 of FIG. 3.

A configuration of first mold surface 441 of first arm 431 may vary in different embodiments. In some embodiments, first mold surface 441 may have a surface contour configured to form an undercut mold surface structure or feature. For example, as shown in an enlarged partial cross-sectional view in the upper left side of FIG. 5, first arm 431 may have a generally rectangular configuration in cross-section, with a vertical height 561 and a horizontal width 562. As shown in FIG. 5, in some embodiments first mold surface 441 of first arm 431 may have a recessed surface contour as viewed from a direction of second arm 432. It will be appreciated that this recessed surface configuration may be configured to form an undercut feature, e.g., at lower edge portion 561 of first mold surface 441. As shown in FIG. 5, in some embodiments a recessed surface contour of first mold surface 441 may be generally continuous in a vertical direction, e.g., having a generally circular or cylindrical concave shape in a vertical direction. In some embodiments, a recessed surface contour of first mold surface 441 may have a discontinuous feature in a vertical direction of first mold surface 441, such as a ridge or bevel feature (see, e.g., embodiments shown in FIG. 6, discussed below). In some embodiments, a surface contour of first mold surface 441 generally may be continuous in a horizontal direction. For example, as shown in FIG. 5, in some embodiments first mold surface 441 generally may have a continuous concave curved configuration in a horizontal direction. In some embodiments, a surface contour of first mold surface 441 may have a discontinuous feature in a horizontal direction. For example, in some embodiments a surface contour of mold surface 441 may have a protruding surface contour feature, e.g., configured to form a vertical recess undercut feature in a peripheral edge of a molded component (see, e.g., vertical recess undercut feature 220 of molded sole component 201 shown in FIGS. 1 to 3). As shown in the enlarged partial view in FIG. 5, in some embodiments this feature may be represented by a protruding curved dashed surface contour line 541.

Similarly, a configuration of second mold surface 443 of second arm 432 may vary in different embodiments. As shown in FIG. 5, in some embodiments second mold surface 443 may have a surface contour configured to form an undercut mold structure or feature. For example, as shown in an enlarged partial cross-sectional view in the upper right side of FIG. 5, second arm 432 may have a generally rectangular configuration in cross-section with a vertical height 563 and a horizontal width 564. As shown in FIG. 5, in some embodiments second mold surface 443 of second arm 432 may have a recessed surface contour as viewed from a direction of first arm 431. It will be appreciated that this recessed surface contour may be configured to form an undercut feature, e.g., at lower edge 562 of second mold surface 443. As shown in FIG. 5, in some embodiments a recessed surface contour in second mold surface 443 may be generally continuous in a vertical direction, e.g., having a generally circular or cylindrical concave shape in a vertical direction. In some embodiments, a recessed surface contour of second mold surface 443 may have a discontinuous feature in a vertical direction of second mold surface 443, such as a ridge or bevel feature (see, e.g., embodiments shown in FIG. 6, discussed below). In some embodiments, second mold surface 443 generally may be continuous in a horizontal direction. For example, similar to first mold surface 441, in some embodiments second mold surface 443 generally may have a continuous concave curved configuration in a horizontal direction. In some embodiments, a surface contour of second mold surface 443 may have a discontinuous feature in a horizontal direction. For example, in some embodiments a surface contour of second mold surface 443 may have a protruding surface contour feature, e.g., configured to form a vertical recess undercut feature in a peripheral edge of a molded component (see, e.g., vertical recess undercut feature 120 of molded sole component 201 shown in FIGS. 1 to 3). As shown in FIG. 5, in some embodiments this feature may be represented by a protruding curved dashed surface contour line 542.

A configuration of first mold surface 441 of first arm 431 relative to second mold surface 443 of second arm 432 may vary in different embodiments. In some embodiments a surface contour of first mold surface 441 and a surface contour of second mold surface 443 generally may be substantially similar but arranged in mirror image configuration. In some embodiments, first mold surface 441 and second mold surface 443 may be configured to form a continuous mold surface contour at distal end 436 of first arm 431 and distal end 438 of second arm 432 in a closed state of mold apparatus 406 (see, e.g., enlarged partial view in FIG. 7, discussed below). In some embodiments, configurations of first mold surface 441 and second mold surface 443 may be different.

FIG. 6 illustrates another embodiment of mold apparatus 406 suitable for mold system 400. A configuration, construction, and operation of mold apparatus 406 in FIG. 6 may be substantially similar to that of mold apparatus 406 shown in FIG. 5. Accordingly, a description of similar features will be omitted in this section, and only differences in the embodiment of FIG. 6 will be described in this section.

As shown in FIG. 6, in some embodiments pivot end 501 of first arm 431 may include an extension 601 having a generally cylindrical shape in a vertical direction and configured to be received in a pivot recess portion 602 of recess 420 formed in lower mold body 402, where pivot recess portion 602 has a corresponding generally cylindrical shape extending in a vertical direction that allows vertical extension 601 to pivot by rotating within pivot recess portion 602. It will be appreciated that, in this configuration, a range of pivot motion of first arm 431 may be controlled by controlling an allowed range of rotation of extension 601 within pivot recess portion 602 of recess 420 of lower mold body 402. Similarly, in some embodiments pivot end 503 of second arm 432 may include an extension 603 having a generally cylindrical shape in a vertical direction and configured to be received in a pivot recess portion 604 of recess 420 formed in lower mold body 402, where pivot recess portion 604 has a corresponding generally cylindrical shape in the vertical direction that allows vertical extension 603 to pivot within pivot recess portion 604. It will be appreciated that, in this configuration, a range of pivot motion of second arm 432 may be controlled by controlling an allowed range of rotation of extension 603 within pivot recess portion 604 of recess 420 of lower mold body 402. For example, in some embodiments a size (e.g., a width or radial angle) of a vertical slot opening 605 of pivot recess portion 602, a width 562 of first arm 431 adjacent pivot end 601, a size (e.g., a width or radial angle) of a vertical slot opening 606 of pivot recess portion 604, and a width 564 of second arm 432 adjacent pivot end 503 may be selected to enable a desired range of rotation of pivot end 601 in pivot recess 602 and a desired range of rotation of pivot end 603 in pivot recess 604, thereby to enable a desired range of pivot motion of first arm 431 and second arm 432. In some embodiments, an allowed range of pivot motion of first arm 431 and second arm 432 may correspond to a desired range of pivot motion between an open state of mold apparatus 406 and a closed state of mold apparatus 406.

In some embodiments, pivot end 501 of first arm 431 and pivot end 503 of second arm 432 variously may include certain pivot structures illustrated in FIG. 5 or FIG. 6. For example, in some embodiments a pivot end 501 of first arm 431 may include a recess or hole 501 located within an extension 601 and configured to receive pivot pin 506 located within a pivot recess portion 602 of lower mold body 402, and a pivot end 503 of second arm 432 may include a recess or hole 507 in an extension 603 and configured to receive a pivot pin 508 located within a pivot recess portion 604 of lower mold body 402. Those skilled in the art will be able to select alternate combinations of pivot structure for mold apparatus 406 suitable for a desired mold system and mold application.

As shown in FIG. 6, in some embodiments at least one of first mold surface 441 of first arm 431 and second mold surface 443 of second arm 432 may have a surface contour having a discontinuous feature extending in a horizontal direction. An enlarged partial cross-sectional view of a portion of first arm 431 is schematically illustrated in the upper left hand side of FIG. 6, and an enlarged partial cross-sectional view of a portion of second arm 432 is schematically illustrated in the upper right hand side of FIG. 6. As shown in FIG. 6, in some embodiments first mold surface 441 may have a discontinuous surface contour or feature that forms a molded undercut structure or feature in a molded component corresponding to first mold surface 441. For example, as shown in FIG. 6, in some embodiments first mold surface 441 may have a ridge 611 formed in a central vertical region of first mold surface 441. Similarly, as shown in FIG. 6, in some embodiments, second mold surface 443 may have a ridge 612 formed in a central vertical region of second mold surface 443. It will be appreciated that, in some embodiments, ridge 611 of first mold surface 441 and ridge 612 of second mold surface 443 may be configured to form a continuous ridge configuration of mold cavity 408 in a closed state of mold apparatus 406, such that a molded component formed by mold apparatus 406 may include a continuous molded undercut structure or feature. For example, in some embodiments molded sole component 201 of FIG. 3 may have a continuous molded undercut feature that extends in a horizontal direction from medial side 107, around heel portion 106, to lateral side 108 of molded sole component 201.

A cam configuration of mold apparatus 406 may vary in different embodiments. For example, in some embodiments a cam configuration of mold apparatus 406 may include a driving cam member 433 having a first driving cam surface formed by a first pin and a second driving cam surface formed by a second pin, the first arm 431 may include a first driven cam surface formed by a first S-shaped recess configured to receive the first pin, and the second arm 432 may include a second driven cam surface formed by a second S-shaped recess, opposing the first S-shaped recess and configured to receive the second pin. It will be appreciated that this cam configuration may be substantially a reversed or mirror image configuration of the cam configuration described in FIG. 5 or FIG. 6, and that a function and operation of this cam configuration may be substantially similar to the function and operation of the cam configuration of FIG. 5 or FIG. 6. In some embodiments, the cam configuration of mold apparatus 406 may use alternative cam structures or mechanisms suitable to pivot first arm 431 and second arm 432 in the first direction and the opposing second direction, respectively. Those skilled in the art will appreciate alternative cam configurations for achieving a cam function and operation suitable for pivoting first arm 431 and second arm 432 between a first position corresponding to a closed configuration of mold apparatus 406 and a second position corresponding to an open configuration of mold apparatus 406.

Molding Process Features

Figure 12:
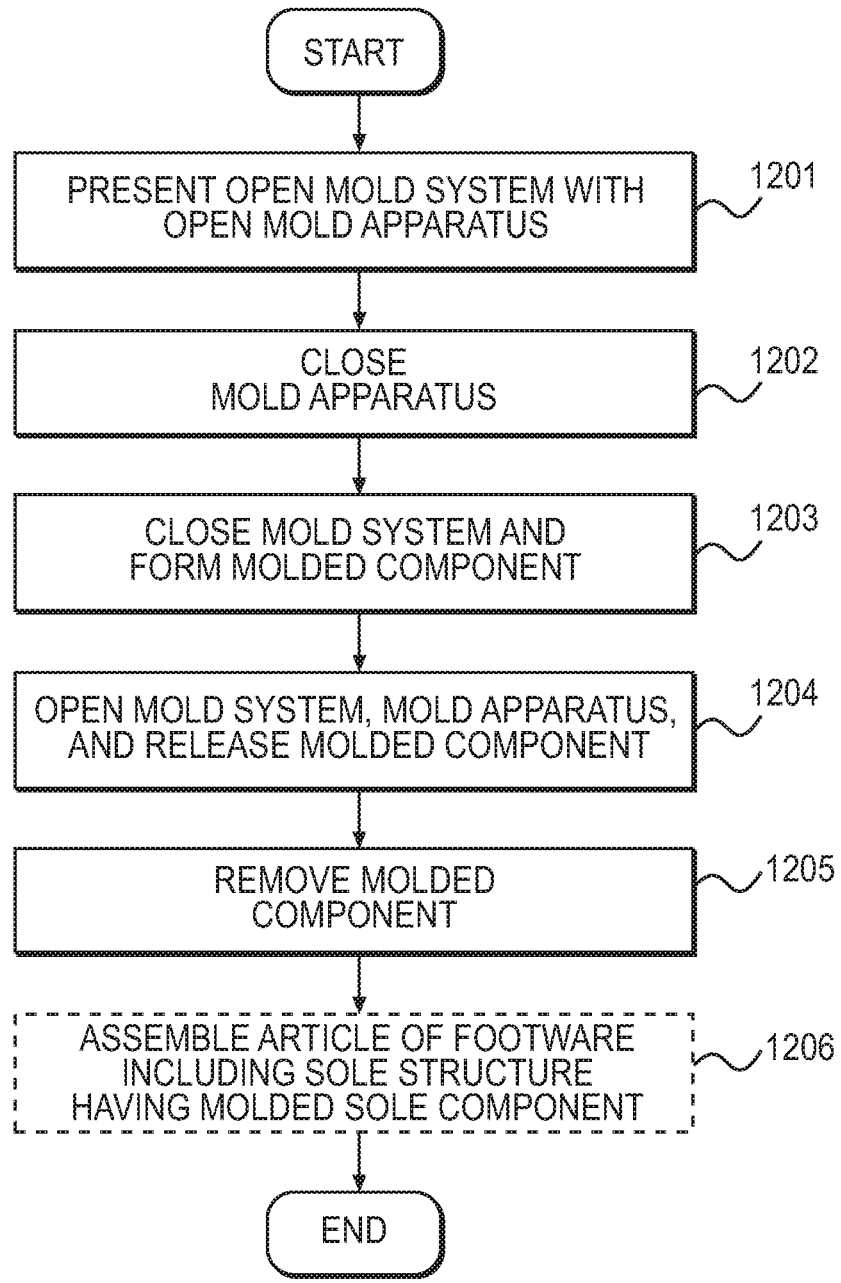
FIG. 12 is a flow chart schematically illustrating processes for molding a molding component using a molding system of FIG. 4.

A method of molding a molded component using a mold system and mold apparatus of FIG. 4 may vary in different embodiments. FIGS. 7 to 11 generally illustrate various configurations and states of mold system 400 and mold apparatus 406 of FIG. 4 for forming a molded component, and FIG. 12 is a flow chart schematically illustrating processes for making a molded component using mold system 400 and mold apparatus 406. In some embodiments, the molded component may have an undercut structure or feature, such as molded sole component 201 of FIGS. 1 to 3.

Figure 7:
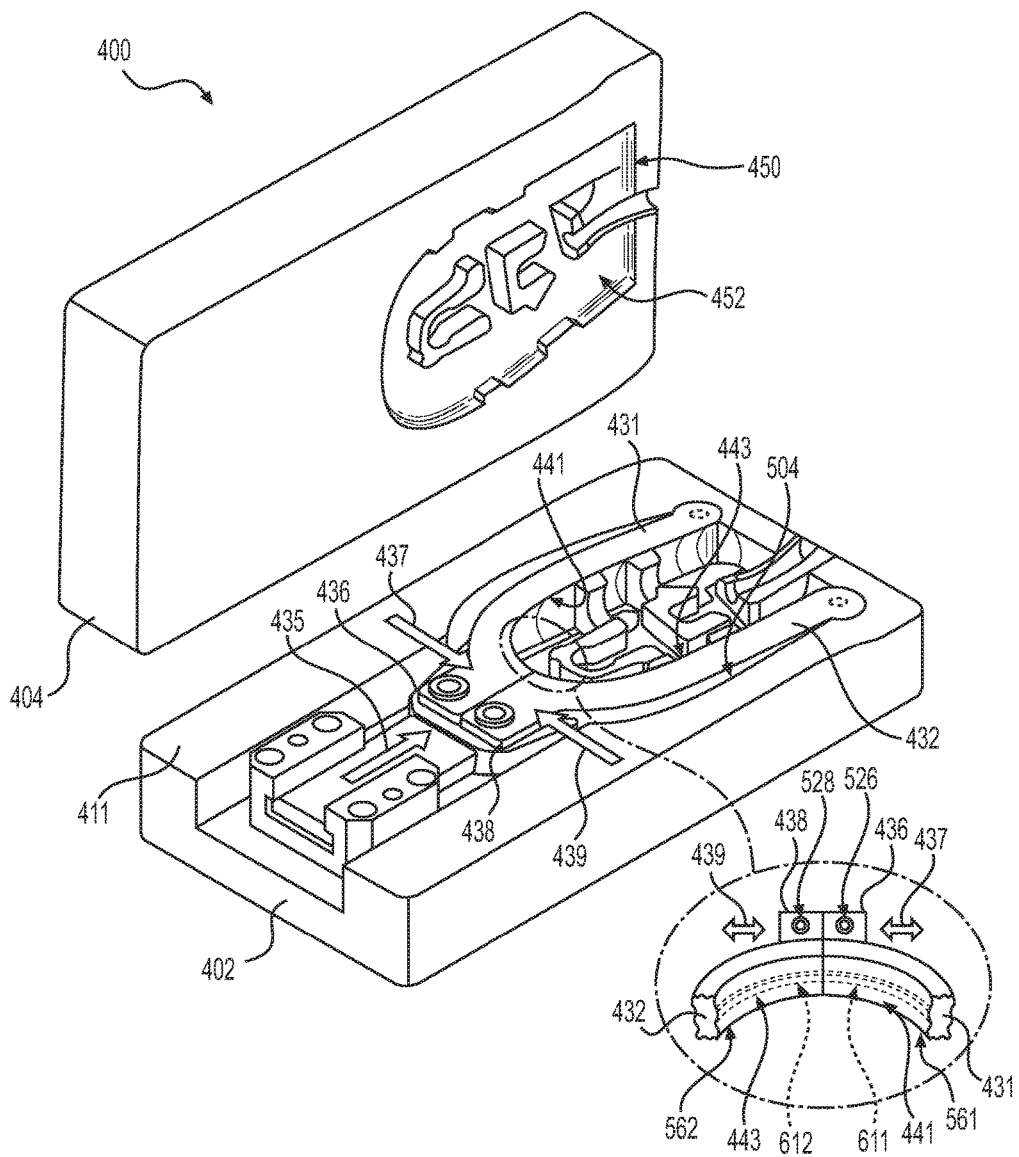
FIG. 7 is a schematic side perspective view of an embodiment of the mold system of FIG. 4 configured in an open state, with mold apparatus configured in a closed state.
Figure 8:
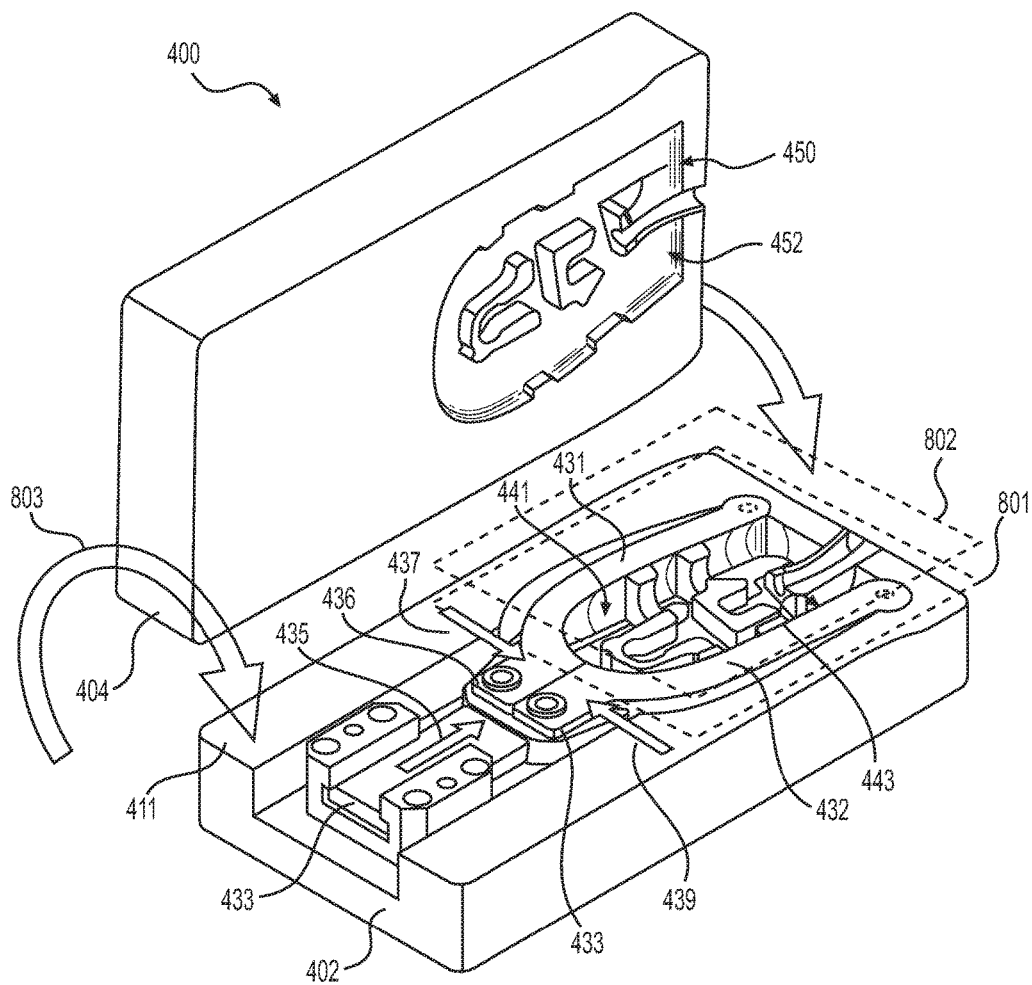
FIG. 8 is a schematic side perspective view of the mold system of FIG. 7 configured in an open state, schematically illustrating an embodiment of a process for molding a molded component of FIG. 3.

In process 1201, mold system 400 may be presented in an open state, with mold apparatus 406 configured in an open state. For example, referring to FIG. 4, in process 1201 driving cam member 433 may be located so that distal end 436 of first arm 431 and distal end 438 of second arm 432 are located remote from one another and mold apparatus 406 is in an open state. In some embodiments, however, as shown in FIG. 7, mold apparatus 406 initially may be presented in a closed state or configuration and process 1201 may be optional (eliminated).

In process 1202, mold apparatus 406 may be closed. For example, referring to FIG. 7, in some embodiments in process 1202 driving cam member 433 may be moved in a direction of arrow 435 toward first arm 431 and second arm 432 to locate first cam pin 526 in first cam position 531 of first cam surface 523, and to locate second cam pin 528 in first cam position 533 of second cam surface 524. It will be appreciated that, in this cam configuration, distal end 436 of first arm 431 may be pivoted in a direction of arrow 437 toward second arm 432, and distal end 438 of second arm 432 may be pivoted in a direction of arrow 439 toward first arm 431, so that distal end 436 of first arm 431 and distal end 438 of second arm 432 may be located adjacent one another and first mold surface 441 of first arm 431 and second mold surface 443 of second arm 432 may form a continuous mold surface. An enlarged partial view of first mold surface 431 of first arm 431 and second mold surface 443 of second arm 432 in a closed configuration of mold apparatus 406 is schematically illustrated in the lower right hand corner of FIG. 7. In this configuration, mold system 400 is configured in an open state and mold apparatus 406 is configured in a closed state, and lower mold body 402 is configured for forming a molded component in mold cavity 408.

In process 1203, mold system 400 may be charged with mold material and closed to perform a molding process. For example, referring to FIG. 8, in some embodiments a first sheet (e.g., lower sheet) of mold material 801 and a second sheet (e.g., upper sheet) of mold material 802 may be disposed between lower mold body 402 and upper mold body 404 of mold system 400, and lower mold body 402 and upper mold body 404 may be engaged, e.g., by rotating upper mold body 404 in a direction of arrow 803, to close mold system 400 (see, e.g., FIG. 9). In some embodiments, second sheet of mold material 802 may be formed of a mold material that is mold compatible with first sheet of mold material 801. For example, in some embodiments first sheet of material 801 may be formed of a first polymer material, and second sheet of mold material 802 may be formed of a second polymer material. In some embodiments, first sheet of mold material 801 and second sheet of mold material 802 may be formed of the same mold material. In process 1203, first sheet of mold material 801 and second sheet of mold material 802 selectively may be conformed to surface contours of mold surfaces of lower mold body 402, upper mold body 404, first arm 431, and second arm 432, e.g., in a thermoforming process, to form a molded component, such as a hollow fluid-filled chamber or support structure. In process 1203, at least one of first sheet of mold material 801 and second sheet of mold material 802 may be conformed to a surface contour of first mold surface 441 of first arm 431 to form a molded undercut feature. Similarly, in process 1203 at least one of first sheet of mold material 801 and second sheet of mold material 802 may be conformed to a surface contour of second mold surface 443 of second arm 432 to form a molded undercut feature. In process 1203, mold system 400 may use various mold assist measures, such as applied heat, applied pressure, compressed or forced air, vacuum techniques, or other mold assist measures, to assist in conforming first sheet of mold material 801 and second sheet of mold material 802 to surface contours of mold cavity 408, to form a hollow fluid-filled chamber or support structure, as is known in the art. Alternatively, in some embodiments a mold material may be injected into mold cavity 408, and the mold material may be manipulated to conform to surface contours of mold surfaces of mold cavity 408 by various molding techniques, such as by a spin molding technique or other molding technique. Alternatively, in some embodiments a charge volume or preform of mold material may be disposed in mold cavity 408 and the mold material may be press molded in mold system 400, e.g., using a hot press molding process, to form a solid molded component, as is known in the art. Those skilled in the art will appreciate various mold materials, mold assist measures, and mold techniques suitable for forming a desired molded component using mold system 400 and mold apparatus 406.

Figure 10:
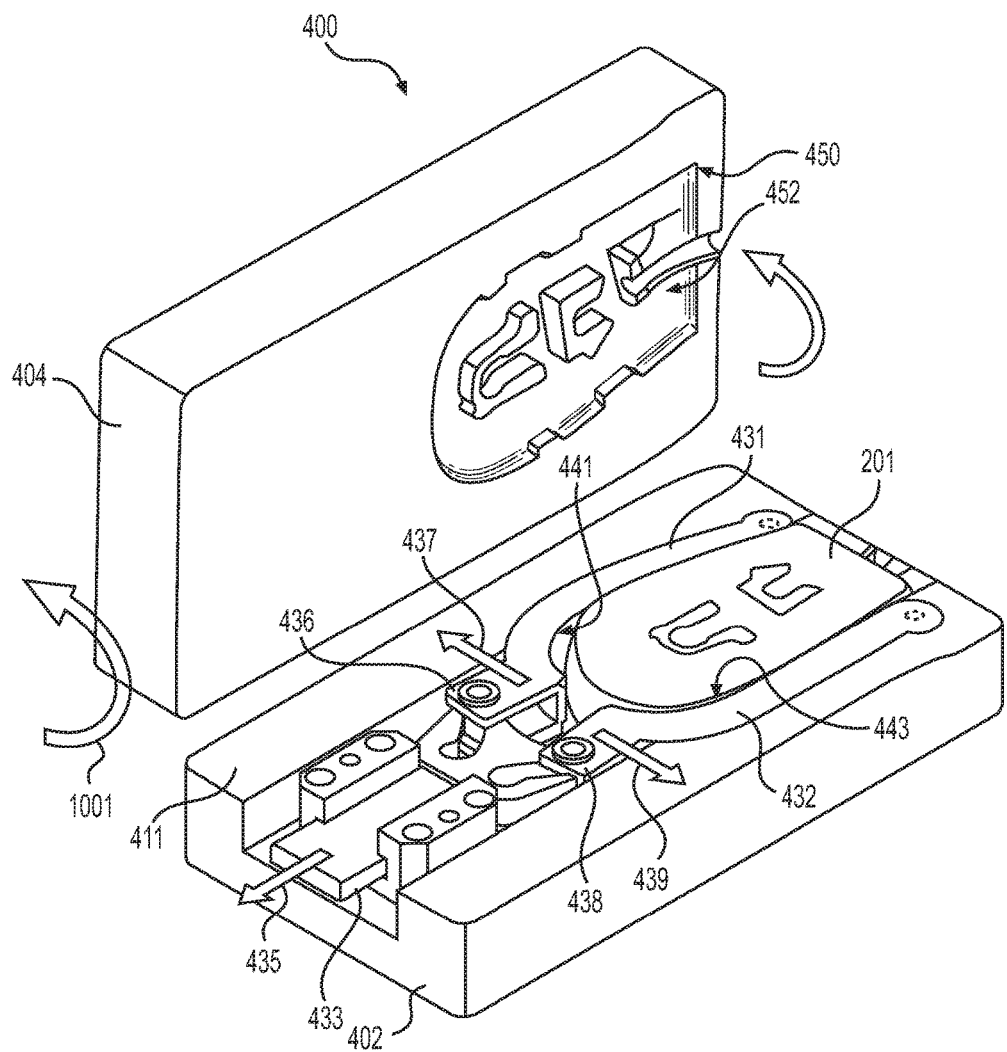
FIG. 10 is a schematic side perspective view of the mold system of FIG. 9 configured in an open state, with mold apparatus configured in an open state, schematically illustrating an embodiment of a process for releasing a molded component.
Figure 11:
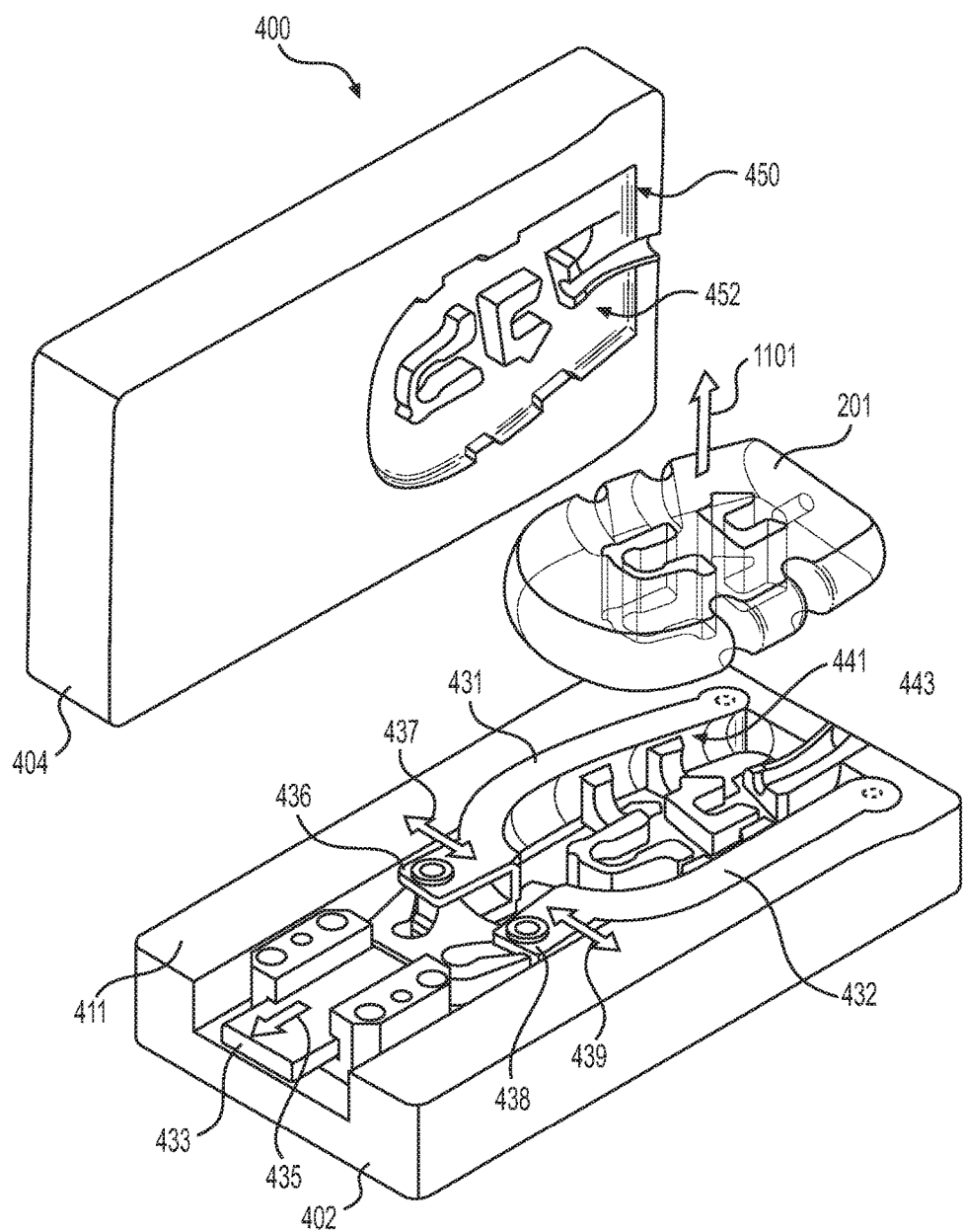
FIG. 11 is a schematic side perspective view of the mold system of FIG. 10 configured in an open state, with mold apparatus configured in an open state, schematically illustrating a process for removing a molded component.

In process 1204, mold system 400 and mold apparatus 406 may be opened to release a molded component formed in mold system 400. For example, referring to FIG. 10, in some embodiments upper mold body 404 may be removed from lower mold body 402, e.g., by rotating upper mold body 404 in a direction of arrow 1001, and driving cam member 433 may be moved in a direction of arrow 435 to locate mold apparatus 406 in an open state or configuration. For example, in some embodiments driving cam member 433 may be moved in a direction of arrow 435 away from first arm 431 and second arm 432 so as to locate first cam pin 526 at second cam position 532 of first cam surface 523 and to locate second cam pin 528 at second cam position 534 of second cam surface 524. In this cam configuration, mold apparatus 406 may be configured in an open state or configuration. It will be appreciated that, in this open configuration of mold apparatus 406, in some embodiments a molded undercut feature of a molded component formed in this molding process by first mold surface 441 of first arm 431 or by second mold surface 443 of second arm 432 may become free from (i.e., separated from or remote from) first mold surface 441 of first arm 431 and/or second mold surface 443 of second arm 432, respectively. For example, as shown in FIG. 10, in some embodiments a molded sole component 201 of FIGS. 1 to 3 may be released from mold apparatus 406 of mold system 400, e.g., forming a gap between at least a portion of a molded component and first arm 431 and/or second arm 432.

In process 1205, a molded component may be removed from mold system 400. For example, referring to FIG. 11, in some embodiments a molded sole component 201 of FIGS. 1 to 3 may be removed from mold system 400 in a direction of arrow 1101. It will be appreciated that, because a molded component having a molded undercut feature may be freed from first mold surface 441 of first arm 431 and/or from second mold surface 443 of second arm 432 by a cam driven pivot operation of first arm 431, second arm 432, and driving cam member 433, in some embodiments a molded component with molded undercut feature may be removed at least substantially unobstructed from mold apparatus 406 and mold apparatus 400.

In optional process 1206, a molded sole component made using process 1201 to process 1205 may be assembled with other sole components to form an assembled sole structure, such as sole structure 102 shown in FIGS. 1 and 2. An assembled sole structure further may be assembled with an upper 101 to form an article of footwear 100, as shown in FIGS. 1 and 2. Of course, in some embodiments, e.g., in embodiments where the molded component is not a molded sole component, process 1206 may be eliminated.

Mold apparatus and mold systems according to embodiments described herein may provide desired improvements in one or more performance characteristics of mold apparatus, mold systems, molding methods, and athletic footwear or other articles of footwear. Embodiments described herein may facilitate efficient manufacture of sole structures and articles of footwear. Benefits explained above with respect to different components, elements and features of mold apparatus and mold systems may be provided by the components, elements, and features individually, and further may be facilitated by combining certain of the components, elements, and features together.

While various embodiments have been described, the description is intended to be exemplary, rather than limiting and it will be apparent to those of ordinary skill in the art that many more embodiments and implementations are possible. Accordingly, the embodiments are not to be restricted except in light of the attached claims and their equivalents. Also, various modifications and changes may be made within the scope of the attached claims.

What is claimed is:

1. A method for molding a molded article, the method comprising:

providing a mold apparatus forming a portion of a mold cavity, the mold apparatus including:

a first arm, the first arm having a first pivot end, a first driven cam surface located distal from the first pivot end, and a first mold surface located between the first pivot end and the first driven cam surface, the first mold surface of the first arm forming a portion of the mold cavity, a first outer surface opposite the first mold surface, a first top surface adjacent the first mold surface, and a first bottom surface opposite the first top surface;

a second arm, the second arm having a second pivot end, a second driven cam surface located distal from the second pivot end, and a second mold surface located between the second pivot end and the second driven cam surface, the second mold surface of the second arm opposing the first mold surface of the first arm, the second mold surface of the second arm forming a portion of the mold cavity, a second outer surface opposite the second mold surface, a second top surface adjacent the second mold surface, and a second bottom surface opposite the second top surface; and a driving cam member, the driving cam member having a first driving cam surface engaging the first driven cam surface of the first arm to pivot the first arm about the first pivot end of the first arm in a first direction, and a second driving cam surface engaging the second driven cam surface of the second arm to pivot the second arm about the second pivot end of the second arm in a second direction opposite the first direction, the driving cam member moving between a first position and a second position in a direction substantially toward or away from the first pivot end of the first arm and substantially perpendicular to at least one of the first direction of pivot of the first arm and the second direction of pivot of the second arm, wherein in the first position of the driving cam member: (a) the first driving cam surface locates the first driven cam surface of the first arm at a first cam position of the first driving cam surface and the first driven cam surface, and (b) the second driving cam surface locates the second driven cam surface of the second arm at a first cam position of the second driving cam surface and the second driven cam surface, wherein in the first position, the first driven cam surface of the first arm and the second driven cam surface of the second arm are located adjacent one another and the first mold surface of the first arm and the second mold surface of the second arm form a continuous mold surface; and in the second position of the driving cam member: (a) the first driving cam surface locates the first driven cam surface of the first arm at a second cam position of the first driving cam surface and the first driven cam surface, and (b) the second driving cam surface locates the second driven cam surface of the second arm at a second cam position of the second driving cam surface and the second driven cam surface, wherein in the first position, the first driven cam surface of the first arm is located remote from the second driven cam surface of the second arm and the first mold surface of the first arm and the second mold surface of the second arm do not form a continuous mold surface;

locating the driving cam member in the first position;

charging the mold cavity with a mold material to form a molded article; and locating the driving cam member in the second position to release the molded article from the mold apparatus.

2. A mold apparatus, comprising:

a first arm, the first arm having a first pivot end, a first driven cam surface located distal from the first pivot end, a first mold surface located between the first pivot end and the first driven cam surface, a first outer surface opposite the first mold surface, a first top surface adjacent the first mold surface, and a first bottom surface opposite the first top surface;

a second arm, the second arm having a second pivot end, a second driven cam surface located distal from the second pivot end, and a second mold surface located between the second pivot end and the second driven cam surface, the second mold surface of the second arm opposing the first mold surface of the first arm, a second outer surface opposite the second mold surface, a second top surface adjacent the second mold surface, and a second bottom surface opposite the second top surface; and a driving cam member, the driving cam member having a first driving cam surface engaging the first driven cam surface of the first arm to pivot the first arm about the first pivot end of the first arm in a first direction, and a second driving cam surface engaging the second driven cam surface of the second arm to pivot the second arm about the second pivot end of the second arm in a second direction opposite the first direction, the driving cam member moving between a first position and a second position in a direction substantially toward or away from the first pivot end of the first arm and substantially perpendicular to at least one of the first direction of pivot of the first arm and the second direction of pivot of the second arm, wherein in the first position of the driving cam member: (a) the first driving cam surface locates the first driven cam surface of the first arm at a first cam position of the first driving cam surface and the first driven cam surface, and (b) the second driving cam surface locates the second driven cam surface of the second arm at a first cam position of the second driving cam surface and the second driven cam surface, wherein in the first position, the first driven cam surface of the first arm and the second driven cam surface of the second arm are located adjacent one another and the first mold surface of the first arm and the second mold surface of the second arm form a continuous mold surface; and in the second position of the driving cam member: (a) the first driving cam surface locates the first driven cam surface of the first arm at a second cam position of the first driving cam surface and the first driven cam surface, and (b) the second driving cam surface locates the second driven cam surface of the second arm at a second cam position of the second driving cam surface and the second driven cam surface, wherein in the second position, the first driven cam surface of the first arm and the second driven cam surface of the second arm are located remote from one another and the first mold surface of the first arm and the second mold surface of the second arm do not form a continuous mold surface.

3. The mold apparatus according to claim 2, wherein at least one of the first mold surface and the second mold surface includes a surface contour configured to form a molded undercut surface feature.

4. The mold apparatus according to claim 2, wherein the first mold surface includes a first surface contour configured to form a first molded undercut surface feature, and the second mold surface includes a second mold surface contour configured to form a second molded undercut surface feature.

5. The mold apparatus according to claim 2, wherein, in the first position of the driving cam member, a first surface contour of the first mold surface and a second surface contour of the second mold surface are configured to form a continuous molded undercut surface feature.

6. The mold apparatus according to claim 2, wherein a first surface contour of the first mold surface is a mirror image of a second surface contour of the second mold surface.

7. The mold apparatus according to claim 2, wherein at least one of the first mold surface and the second mold surface includes a first surface contour configured to form a first molded undercut surface feature and a second surface contour configured to form a second molded undercut surface feature, the second molded undercut surface feature being different from the first molded undercut surface feature.

8. The mold apparatus according to claim 2, wherein the first mold surface includes a mold surface contour that is curved in a direction extending from the first mold surface toward the first outer surface of the first arm.

9. The mold apparatus according to claim 2, wherein the second mold surface includes a mold surface contour that is curved in a direction extending from the second mold surface toward the second outer surface of the second arm.

10. The mold apparatus according to claim 2, wherein the first mold surface includes a mold surface contour that is curved in a direction extending from the first top surface toward the first bottom surface of the first arm.

11. The mold apparatus according to claim 2, wherein the second mold surface includes a mold surface contour that is curved in a direction extending from the second top surface toward the second bottom surface of the second arm.

12. The mold apparatus according to claim 2, wherein the second mold surface is substantially a mirror image configuration of the first mold surface.

13. The mold apparatus according to claim 2, wherein the first mold surface is configured to form a medial peripheral side edge of a molded sole component of an article of footwear, and the second mold surface is configured to form a lateral peripheral side edge of the molded sole component of the article of footwear.

14. The mold apparatus according to claim 2, wherein one of the first driving cam surface of the driving cam member and the first driven cam surface of the first arm comprises a recess having an S-shaped configuration, and the other one of the first driving cam surface of the driving cam member and the first driven cam surface of the first arm comprises a pin configured to follow the recess having the S-shaped configuration.

15. The mold apparatus according to claim 2, wherein the driving cam member includes a slide portion supported by a guide member, and the driving cam member moves between the first position and the second position by a sliding movement relative to the guide member.

16. The mold apparatus according to claim 2, wherein at least one of the first driving cam surface and the second driving cam surface of the driving cam member is formed by a recess in the driving cam member, the recess having a generally S-shaped configuration.

17. The mold apparatus according to claim 2, wherein the first driving cam surface includes a first S-shaped configuration, and the second driving cam surface includes a second S-shaped configuration, the second S-shaped configuration being a mirror image of the first S-shaped configuration.

18. The mold apparatus according to claim 2, wherein, in the first position of the driving cam member, at least one of the first cam position of the first driven cam surface and the first cam position of the second driven cam surface is located at an end portion of a recess having an S-shaped configuration, the end portion of the recess having a straight configuration that extends substantially parallel to a direction of movement of the driving cam member.

19. The mold apparatus according to claim 2, further comprising: a mold body, the mold body having a mold surface that forms a portion of a mold cavity of a mold system, the first pivot end of the first arm and the second pivot end of the second arm each being pivotally engaged with the mold body, the first mold surface of the first arm and the second mold surface of the second arm each forming a portion of the mold cavity of the mold apparatus.

20. A mold system comprising:
a mold body having: (a) an upper surface; (b) a lower surface opposite the upper surface; (c) a first end adjacent the upper surface; (d) a second end opposite the first end: and (e) a recess formed in the upper surface, wherein the recess includes a mold surface that forms a portion of a mold cavity; (f) a first pivot recess portion; and (g) a second pivot recess portion, wherein the first pivot recess portion and the second pivot recess portion are both proximate the first end of the mold body;
a mold apparatus inserted into the mold cavity, wherein the mold apparatus comprises:
a first arm located along a first side of the recess, wherein the first arm includes a first pivot end engaged with the mold body at the first pivot recess portion, a first distal end opposite the first pivot end, and a first mold surface located between the first pivot end and the first distal end, the first mold surface of the first arm forming a portion of the mold cavity,
a second arm located along a second side of the recess opposite the first side, wherein the second arm includes a second pivot end engaged with mold body at the second pivot recess portion, a second distal end opposite second pivot end, and a second mold surface located between the second pivot end and the second distal end, the second mold surface of the second arm located opposite the first mold surface of the first arm, the second mold surface of the second arm forming a portion of the mold cavity,
a driving cam member located within the recess proximate the second end of the mold body, wherein the driving cam member includes a slide portion and a cam portion, wherein the cam portion includes a first recess having a generally S-shaped configuration and a second recess having a generally S-shaped configuration, wherein the first recess and the second recess have a mirror image configuration,
a first cam pin engaging the first distal end of the first arm and the first recess of the driving cam member and a second cam pin engaging the second distal arm of the second arm and the second recess of the driving cam member,
wherein when the driving cam member moves in a direction toward the first end of the mold body: (a) the first cam pin moves with respect to the first recess, and (b) the second cam pin moves with respect to the second recess of the cam portion, (c) the first arm moves in a first pivot direction, and (d) the second arm moves in a second pivot direction, wherein the first distal end of the first arm and the second distal end of the second arm move in a direction toward each other; and
wherein when the driving cam member moves in a direction away the first end of the mold body: (a) the first cam pin moves with respect to the first recess, and (b) the second cam pin moves with respect to the second recess of the cam portion, (c) the first arm moves in a first pivot direction, and (d) the second arm moves in a second pivot direction, wherein the first distal end of the first arm and the second distal end of the second arm move in a direction away from each other.

* * * * *